(12) United States Patent
Choi et al.

(10) Patent No.: US 9,401,981 B2
(45) Date of Patent: Jul. 26, 2016

(54) DATA PROCESSING METHOD AND ELECTRONIC DEVICE SUPPORTING THE SAME

(71) Applicant: Samsung Electronics Co., Ltd., Gyeonggi-do (KR)

(72) Inventors: Bo Kun Choi, Seoul (KR); Doo Suk Kang, Gyeonggi-do (KR); Geon Soo Kim, Gyeonggi-do (KR); Dong Hyun Yeom, Gyeonggi-do (KR); Pil Joo Yoon, Gyeonggi-do (KR); Yong Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/323,888

(22) Filed: Jul. 3, 2014

(65) Prior Publication Data
US 2015/0172435 A1    Jun. 18, 2015

(30) Foreign Application Priority Data
Dec. 13, 2013    (KR) ...................... 10-2013-00155914

(51) Int. Cl.
*H04M 1/725*    (2006.01)
*H04W 76/02*    (2009.01)
*H04W 4/00*    (2009.01)

(52) U.S. Cl.
CPC ........ *H04M 1/7253* (2013.01); *H04M 1/72525* (2013.01); *H04W 4/008* (2013.01); *H04W 76/023* (2013.01)

(58) Field of Classification Search
CPC .... H04W 48/14; H04W 84/18; H04M 1/7253
USPC .............................................. 455/41.2, 569.2
See application file for complete search history.

(56) References Cited

U.S. PATENT DOCUMENTS

| | | | |
|---|---|---|---|
| 8,326,486 B2 | 12/2012 | Moinzadeh et al. | |
| 8,731,614 B2 | 5/2014 | Kim et al. | |
| 2010/0227596 A1* | 9/2010 | Suresh ................... | H04M 3/493 455/414.2 |
| 2011/0093136 A1 | 4/2011 | Moinzadeh et al. | |
| 2012/0276953 A1 | 11/2012 | Kim et al. | |
| 2013/0237270 A1* | 9/2013 | Suumaki ............. | H04M 1/7253 455/517 |

FOREIGN PATENT DOCUMENTS

| | | |
|---|---|---|
| KR | 10-0731919 | 6/2007 |
| KR | 10-2011-0087111 | 8/2011 |
| KR | 10-2012-0084764 | 7/2012 |
| KR | 10-2012-0108763 | 10/2012 |
| KR | 10-2012-0122051 | 11/2012 |

* cited by examiner

Primary Examiner — Kwasi Karikari

(57) ABSTRACT

An electronic device includes a short range communication module configured to establish a communication channel for collecting device-related information on at least one other electronic device. The electronic device also includes a communication module configured to establish a communication channel with a service supporting device. The electronic device also includes a control module configured to transmit a message requesting function-related information installable or updatable on the other electronic device to the service supporting device in correspondence to the device-related information and configured to control transmitting identification information for receiving the function-related information and the device-related information.

20 Claims, 17 Drawing Sheets

DATA PROCESSING METHOD AND ELECTRONIC DEVICE SUPPORTING THE SAME

CROSS-REFERENCE TO RELATED APPLICATION(S) AND CLAIM OF PRIORITY

The present application can be related to and claims priority under 35 U.S.C. §119 to an application filed in the Korean Intellectual Property Office on Dec. 13, 2013 and assigned Application No. 10-2013-00155914, the contents of which are incorporated herein by reference.

TECHNICAL FIELD

The present invention relates to the installation or updating of data relating to a specific function of an electronic device.

BACKGROUND

With recent developments in digital technology, electronic devices available for communication and personal data processing on the move, such as mobile communication terminals, personal digital assistants (PDAs), electronic organizers, smart phones, and tablet personal computers (PCs), are being diversely released. Such electronic devices may not stay in their own traditional specific areas and can attain a mobile convergence stage in which they embrace the areas of other terminals.

Typically, an electronic device may include a call function such as a voice call or a video call function, a message transmission function such as a short message service (SMS)/multimedia message service (MMS) and an e-mail function, an electronic organizer function, a recording function, a TV playback function, a video playback function, a music playback function, an Internet function, a messenger function, and a social networking service (SNS) function. The electronic device may download an application corresponding to the above function from a server device and may install the downloaded application.

The electronic device can provide a function for interlocking with a peripheral device. Here, the peripheral device may include an output device for outputting audio data or a display device for outputting video data according to the execution of a function in an electronic device.

Moreover, a conventional peripheral device can be manufactured below a predetermined size according to a specific purpose such as portability or mounting. For example, a conventional peripheral device may limit the size of a mounted battery or may present difficulties in mounting a specific communication module. Accordingly, the conventional peripheral device may have difficulties in receiving information relating to a specific function through direct market access due to a power issue or difficulty in establishing a communication channel.

SUMMARY

To address the above-discussed deficiencies, it is a primary object to provide a data processing method for efficiently performing installation or updating of information relating to a specific function such as an application or firmware of an electronic device, and an electronic device supporting the same.

In a first example, an electronic device includes a short range communication module configured to establish a communication channel for collecting device-related information on at least one other electronic device. The electronic device also includes a communication module configured to establish a communication channel with a service supporting device. The electronic device further includes a control module configured to transmit a message requesting function-related information installable or updatable on the other electronic device to the service supporting device in correspondence to the device-related information and configured to control transmitting identification information for receiving the function-related information and the device-related information.

In a second example, the control module may be configured to control the transmission of device-related information on the other electronic device establishing the communication channel to the service supporting device through the short range communication module, or control the transmission of device-related information on another electronic device receiving a request for function management among the other electronic devices establishing the communication channel through the short range communication module to the service supporting device.

In a third example, electronic device may further include a storage module configured to store the collected device-related information, wherein the control module may be configured to transmit the device-related information stored in the storage module to the service supporting device or may be configured to transmit device-related information selected by a user input among the stored device-related information to the service supporting device.

The control module may be configured to control the delivering of at least one function-related information installable or updatable on the other electronic device received from the service supporting device and a function-related information list configured with display items of the function-related information to the other electronic device.

In a fourth example, electronic device may further include a display module configured to output the received function-related information list, wherein the display module may be configured to separate and display a function-related information display item applicable to each of the electronic device and another electronic device or may be configured to separate and display application or firmware update information and installable application information on the other electronic device.

In a fifth example, electronic device may further include a display module configured to output the received function-related information list, wherein the control module may be configured to request function-related information corresponding to an item selected by an event that has occurred in the function-related information list outputted to the display module from the service supporting device.

In a sixth example, control module may be configured to extract items to be transmitted to another electronic device from the function-related information list, or upon receipt of a specific function-related information request from the other electronic device, may be configured to transmit the received function-related information request to the service supporting device, and may be configured to receive corresponding function-related information and deliver the received function-related information to the other electronic device, or upon receipt of a package collaborated between the electronic device and the other electronic device, may be configured to extract routines to be transmitted to the other electronic device and may be configured to deliver the extracted routines to the other electronic device, or may be configured to extract function-related information to be transmitted to another electronic device from the received function-related information and may be configured to deliver the extracted function-related information to the other electronic device automatically.

In a seventh example, the function-related information may include at least one of an application and firmware applicable to the other electronic device and can update information on an application or firmware installed on the other electronic device.

In an eighth example, the communication module may be configured to receive at least one of the function-related information list or the selected function-related information from the service supporting device in correspondence to a request for function-related information to be installed or updated on the other electronic device. The control module may be configured to extract information to be delivered to the other electronic device from the received function-related information list or function-related information and may be configured to deliver the extracted information to the other electronic device through the short range communication module.

In a ninth example, the electronic device may further include a display module configured to separate and display function-related information applicable to each of the electronic device or the other electronic device or configured to separate and display application or firmware update information and installable application information on the other electronic device, or configured to display at least one of an item of an application un-installed on the other electronic device, an item of an integrated application linked with the electronic device, an un-installable item, or an item of an application installed on the other electronic device in correspondence to items of applications installed on the electronic device.

In a tenth example, the electronic device may further include a display module configured to output the received function-related information list, wherein the control module may be configured to request function-related information corresponding to an item selected by a received event in the function-related information list outputted to the display module from the service supporting device.

In an eleventh example, the control module may be configured to extract items to be transmitted to the other electronic device from the function-related information list by each of the other electronic device, or upon receipt of a specific function-related information request from the other electronic device, may be configured to transmit the received function-related information request to the service supporting device, and receive corresponding function-related information and may be configured to deliver the received function-related information to the other electronic device, or may be configured to extract function-related information to be transmitted to the other electronic device from the received function-related information and may be configured to deliver the extracted function-related information to the other electronic device automatically, or upon receipt of a package collaborated between the electronic device and the other electronic device, may be configured to extract routines to be transmitted to the other electronic device and may be configured to deliver the extracted routines to the other electronic device.

In a twelfth example, the electronic device may further include a display module configured to display at least one of an item of an application un-installed on the other electronic device, an item of an integrated application linked with the other electronic device, an un-installable item, or an item of an application installed on the other electronic device in correspondence to installed application items.

In a thirteenth example, a data processing method includes collecting, by a first electronic device, device-related information on at least one second electronic device connectable through a short range communication channel in correspondence to an event occurrence. The method also includes transmitting, by the first electronic device, the collected device-related information and identification on the first electronic device to the service supporting device.

In a fourteenth example, the method may further include at least one of receiving at least one function-related information installable or updatable on the first electronic device or a function-related information list. The method also includes receiving an integrated application or integrated application item including some routines installable on the second electronic device and configured to perform a function through the first electronic device and some routines to be applied to the first electronic device.

In a fifteenth example, the method may further include delivering, by the first electronic device, at least one of the function-related information and the function-related information list to the second electronic device.

In a sixteenth example, the method may further include outputting, by the second electronic device, the function-related information list; transmitting, by the second electronic device, a selection event for selecting at least one item from the function-related information list, to the first electronic device. The method may also include transmitting, by the first electronic device, the selection event to the service supporting device. The method may further include transmitting, by the service supporting device, function-related information corresponding to the selection event to the first electronic device. The method may include transmitting, by the first electronic device, function-related information corresponding to the selection event to the second electronic device. The method may further include processing, by the second electronic device, the function-related information.

In a seventeenth example, the method may further include delivering, by the second electronic device, the function-related information processing result to the first electronic device or delivering, by the second electronic device, the function-related information processing result to the service supporting device through the first electronic device.

In an eighteenth example, transmitting by the first electronic device the collected device related information and information on the first electronic device to a service supporting device may include at least one of transmitting device-related information on the at least one second electronic device establishing the short range communication channel to the service supporting device, transmitting device-related information on a second electronic device receiving a function management request from the among second electronic devices establishing the short range communication channel to the service supporting device, collecting pre-stored device-related information on at least one second electronic device and transmitting the collected device-related information to the service supporting device, and transmitting device-related information selected by a user input in pre-stored device-related information on a second electronic device to the service supporting device.

In a nineteenth example, the method may further include at least one of separating and displaying, by the first electronic device, function-related information applicable to each of the first electronic device and the second electronic device, and separating and displaying, by at least one of the first electronic device and the second electronic device, application or firmware update information and installable application information on the second electronic device.

Before undertaking the DETAILED DESCRIPTION below, it can be advantageous to set forth definitions of certain words and phrases used throughout this patent document:

the terms "include" and "comprise," as well as derivatives thereof, mean inclusion without limitation; the term "or," can be inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases can be provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference can be now made to the following description taken in conjunction with the accompanying drawings, in which like reference numerals represent like parts.

DETAILED DESCRIPTION

Figure 1:
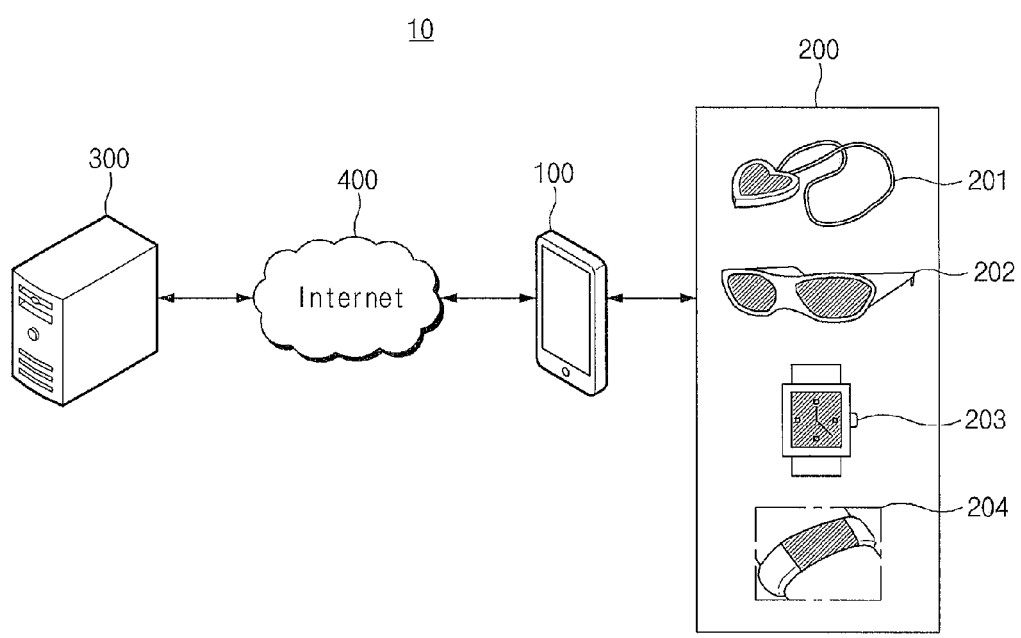
FIG. 1 is a view illustrating an example environment supporting data processing of an electronic device according to this disclosure.

FIGS. 1 through 17, discussed below, and the various embodiments used to describe the principles of the present disclosure in this patent document can be by way of illustration only and should not be construed in any way to limit the scope of the disclosure. Those skilled in the art will understand that the principles of the present disclosure may be implemented in any suitably arranged communication system. Hereinafter, embodiments of the present invention will be described in more detail with reference to the accompanying drawings. At this point, it should be understood that like reference numerals refer to like elements in the accompanying drawings. Moreover, detailed descriptions related to well-known functions or configurations will be ruled out in order not to unnecessarily obscure subject matters of the present invention. That is, in the following description, only necessary parts to understand operations according an embodiment of the present invention are described, and description of other parts is omitted not to obscure subject matters of the present invention.

Electronic devices according to various embodiments of the present invention in the following description may include all devices using an application processor (AP), a graphic processing unit (GPU), or a central processing unit (CPU) in addition to all information communication devices supporting functions described herein, multimedia devices, or application devices therefor. For example, a plurality (hereinafter referred to as a first electronic device, for convenience of description) of the electronic devices may include devices such as mobile communication terminals operating based on communication protocols corresponding to various communication systems, tablet personal computers (PCs), smartphones, digital cameras, portable multimedia players (PMPs), media players, portable game consoles, and personal digital assistants (PDAs).

Another plurality (hereinafter referred to as a second electronic device, for convenience of description) of the electronic devices may include different types of wearable electronic devices such as electronic watches, electronic bracelets, electronic ankle bracelets, electronic necklaces, electronic earrings, electronic rings, and electronic belts, which can be capable of communicating with the other part. According to various embodiments of the present invention, the electronic device may be part of suits, pants, hats, pauldrons, or masks. According to another embodiment, the second electronic device may be an electronic device identical or similar to the first electronic device (for example, a portable terminal or a smartphone).

In addition to the wearable electronic device, the second electronic device may be an electronic device installed at a specific power device. For example, the second electronic device may be a vehicle where a communication module (for example, a short range communication module) is disposed or mounted. Accordingly, the second electronic device described herein may not be limited to a wearable electronic device or a specific form of an electronic device and may be understood as including a network communication module (for example, a short range communication module capable of communicating with another electronic device). According to an embodiment of this disclosure, the second electronic device may further include at least part of various components, for example, a variety of components that may be included in the first electronic device.

Hereinafter, a data processing system according to this disclosure, each configuration included in a corresponding system, a system operating method, and a method of operating each configuration will be described with reference to the accompanying drawings. Since a system and device and an operating method may not be limited to the content described below, it should be understood that they may be applied to various embodiments on the basis of embodiments below. For example, in the description below, electronic devices may be divided into the first electronic device and the second electronic device but various embodiments of this disclosure may not be limited thereto. For example, the first electronic device and the second electronic device may be named as another electronic device or a specific electronic device. The first electronic device may be named as another electronic device in terms of the second electronic device. Or, the second electronic device may be named as another electronic device in terms of the first electronic device. Or, a specific second electronic device among a plurality of second electronic devices may be named as another electronic device in terms of the second electronic device.

Function-related information described below may include application or firmware information, which can be installable on at least one of the first electronic device or the second electronic device or updatable. Also, a function-related information list may be configured with a display item of at least one function-related information. Accordingly, the function-related information list may be outputted on at least one display area of the first electronic device or the second electronic device as a display item corresponding to at least one function-related information. If a specific display item can be selected from the function-related information list, a corresponding device, for example, the first electronic device or the second electronic device, may request function-related information corresponding to the selected display item from a service supporting device and receive the requested function-related information. In an embodiment, the function-related information list may be configured with a list including each function-related information. In this case, the first electronic device may receive entire installable or updatable function-related information as a list. With regard to the efficiency of information transmission, in the description below, a function-related information list displays at least one function-related information and can be configured with a display item that requests the transmission of function-related information corresponding to a selected display item.

FIG. 1 is a view illustrating an example environment supporting data processing of an electronic device according to this disclosure.

A data processing system 10 may provide a communication environment in which at least one electronic device installs or updates (for example, download from an application store, install or update) an application or firmware relating to a function of the at least one electronic device.

Referring to FIG. 1, the data processing system 10 may include a first electronic device 100, at least one second electronic device 200, a service supporting device 300, and a communication network 400. Here, the communication network 400 of the data processing system 10 may support communication service between the service supporting device 300 and the first electronic device 100. In an embodiment, the communication network 400 may support communication service between the service supporting device 300 and at least one second electronic device 200.

In the data processing system 10, the first electronic device 100 may support processing data necessary for at least one second electronic device 200, for example, application or firmware related data. In an embodiment, the second electronic device 200 may request function management for installing or updating a function of the second electronic device 200 (for example, an application executed or to be executed in at least one second electronic device 200 and a function or firmware relating to an application) to the first electronic device 100. Upon receipt of a function management request, the first electronic device 100 may provide data necessary for at least one second electronic device 200 (for example, information on an application executed or to be executed in the second electronic device 200 (hereinafter referred to as an app, for convenience of description) or an app or firmware related function) to the second electronic device 200.

The data (for example, function-related information) may include at least one of firmware, firmware update data, hardware update data, operating system update data, specific platform update data, installation information on a specific app, and update information on a specific app of a specific electronic device, for example, at least one of the first electronic device 100 and the second electronic device 200. In the description below, for convenience of description, firmware and app related information can be exemplarily described as function-related information.

In an embodiment, the first electronic device 100 may form a communication channel (for example, a short range communication channel) with at least one second electronic device 200. Additionally, the first electronic device 200 may receive device-related information on each of at least one second electronic device 200 from the at least one second electronic device 200. The device-related information, for example, may include firmware or app state information or device attribute information on the second electronic device 200 (for example, at least one of hardware information on an electronic device, work function type information, program state information, and battery state information). The firmware or app state information may include at least one of a variety of information such as firmware or app type information, firmware or app version information, or firmware or app capacity information.

The first electronic device 100 may deliver device-related information received from at least one second electronic device 200 to the service supporting device 300. Additionally, the first electronic device 100 may receive function-related information including at least one of firmware to be applied to at least one second electronic device 200 and update information on an installable app or firmware or an app installed on the second electronic device 200, which can be determined based on the device-related information, from the service supporting device 300. Additionally, the first electronic device 100 may deliver device-related information received from the service supporting device 300 to the second electronic device 200.

In an embodiment, when receiving the device-related information on at least one second electronic device 200, the service supporting device 300 may confirm whether there is function-related information newly installable on the at least one second electronic device 200 or to be updated on the basis of the device-related information. If there is corresponding function-related information, the service supporting device 300 may deliver the function-related information to the first electronic device 100. The function-related information may be delivered to the second electronic device 200 through the first electronic device 100.

In an embodiment, if there is function-related information on at least one second electronic device 200, the service supporting device 300 may provide information according thereto (hereinafter referred to as a function-related information list, for convenience of description) to the first electronic device 100. For example, the service supporting device 300 may deliver function-related information including at least one of an updatable app and an installable app for the second electronic device 200, firmware to be applied to the second electronic device 200, and updatable firmware for the second electronic device 200 as the function-related information list to the first electronic device 100. The function-related information list may not include data corresponding to actual function-related information but may be configured with a display item for requesting the download of specific function-related information. In an embodiment, the function-related information list may be configured with a format including all function-related information. The function-related information list having a format including display item information of specific function-related information is described herein.

In an embodiment, the first electronic device 100 may receive service information (for example, a service page) including a function-related information list including items corresponding to function-related information so as to select at least one function-related information from the service supporting device 300. The service information may include at least one of various forms such as a webpage, a message, and a pop-up window, which can be provided by the service supporting device 300 and outputted to a display device of at least one of the first electronic device 100 and the second electronic device 200. The service information that the first electronic device 100 receives may vary in correspondence to at least one of identification information or device-related information. The function-related information may include at least one of text or an image corresponding to specific firmware, firmware update information, a specific app, or app update information. When an event for selecting one of specific function-related information included in service information occurs, the first electronic device 100 may request the function-related information designated by the selection event from the service supporting device 300 and receive it. Here, the function-related information selection may occur by default. The first electronic device 100 may deliver the received function-related information to the second electronic device 200.

The service supporting device 300 may provide a function-related information list to each of at least one second electronic device 200 through the first electronic device 100. The function-related information list may be configured with information including at least one of text or an image guiding corresponding function-related information. When a specific item in the function-related information list is selected, function-related information corresponding to the selected item may be provided from the service supporting device 300 to the first electronic device 100. In an embodiment, when communicating with the service supporting device 300, the first electronic device 100 may provide device-related information on the second electronic device 200 (for example, device-related information on the second electronic device 200 stored in the first electronic device 100 or selected by a user input). The first electronic device 100 may receive a function-related information list to be provided to at least one second electronic device 200 from the service supporting device 300 in response to the device-related information. The first electronic device 100 may deliver the function-related information corresponding to a user selection on a specific item from the function-related information list or set by default to the corresponding second electronic device 200.

Through the above-mentioned operations, the data processing system 10 may perform at least one processing of firmware installation or update or app installation or update of the second electronic device 200 more easily and may perform firmware management or app management of at least one second electronic device 200 integrally and simply.

The communication network 400 may support a specific communication channel between the service supporting device 300 and the first electronic device 100, for example, an internet network channel. The communication network 400 may be configured with various network devices configuring an internet network. The communication network 400, for example, may allocate predetermined information between the service supporting device 300 and the first electronic device 100 and may support communication service between the service supporting device 300 and the first electronic device 100 on the basis of corresponding address information. The communication network 400, as a network implemented to transmit/receive data between the service supporting device 300 and the first electronic device 100, may not be limited to a specific communication method or a specific communication device. In an embodiment, the communication network 400 may establish a communication channel between the service supporting device 300 and at least one second electronic device 200.

In an embodiment, the communication network 400 may deliver an access request for the service supporting device 300 of the first electronic device 100 to the service supporting device 300 and may establish a communication channel between the first electronic device 100 and the service supporting device 300 in response to the access permission of the service supporting device 300. The communication network 400 may deliver device-related information on at least one second electronic device 200 that the first electronic device 100 collects to the service supporting device 300 in addition to the identification information on the first electronic device 100. Here, the communication network 400 may deliver only the device-related information or the identification information on the first electronic device 100 to the service supporting device 300. The communication network 400 may deliver function-related information including at least one of specific firmware information, firmware update information, specific app installation information, or app update information from the service supporting device 300 to the first electronic device 100 in response to a request of the first electronic device 100.

The service supporting device 300 may establish a communication channel with the first electronic device 100 through the communication network 400. The service supporting device 300 may provide function-related information corresponding to at least one app (or firmware) to the first electronic device 100 in response to a request (for example, an app or firmware installation request) of the first electronic device 100. Additionally, the service supporting device 300 may provide at least one of corresponding specific firmware update information and app update information to the first electronic device 100 in response to a request (for example, an app or firmware update request) of the first electronic device 100.

In an embodiment, the service supporting device 300 may receive device-related information relating to the second electronic device 200 from the first electronic device 100. The service supporting device 300 may provide function-related information (or a function-related information list) including at least one of firmware and an app installable (or updatable) on a corresponding device on the basis of the device-related information to the first electronic device 100. The service supporting device 300 may be a server device supporting app store service or firmware management.

In an embodiment, the service supporting device 300 may store or manage device-related information on at least one second electronic device 200. When a specific app (or firmware) or app (or firmware) update information is newly created or stored, the service supporting device 300 may select the second electronic device 200 where a new app (or firmware) installable or an app (or firmware) update is required on the basis of the stored device-related information. The service supporting device 300 may provide function-related information relating to a corresponding app (or firmware) to the first electronic device 100 managing the selected second electronic device 200. The first electronic device 100 may establish a communication channel (for example, a short range communication channel) with the second electronic device 200. For example, the first electronic device 100 may search for the second electronic device 200 and may form a communication channel (for example, a short range communication channel) with the second electronic device 200 automatically or in response to a user input. The first electronic device 100 may receive device-related information from at least one second electronic device 200 through the communication channel. In an embodiment, upon receipt of the device-related information, the first electronic device 100 may store and manage the received device-related information by each second electronic device 200.

The first electronic device 100 may communicate with the service supporting device 300 on the basis of the communication network 400. The first electronic device 100 may register at least part of the identification information in the service supporting device 300. For example, the first electronic device 100 may register at least one of ID and password as identification information in the service supporting device 300. In an embodiment, the first electronic device 100 may register at least one of MAC information on a device, specific address information and phone number information as identification information in the service supporting device 300. The identification information, for example, may be used for the service supporting device 300 to confirm the first electronic device 100 or may be used for forming a communication channel between the service supporting device 300 and the first electronic device 100. The first electronic device 100 may deliver its identification information and device-related information collected through a communication channel to the service supporting device 300.

In an embodiment, the first electronic device 100 may receive at least one function-related information from the service supporting device 300. In an embodiment, the first electronic device 100 may receive a function-related information list including at least one of text or an image requesting the reception of at least one function-related information. Here, the first electronic device 100 may receive service information (for example, a service page) including a function-related information list. The service information that the first electronic device 100 receives may vary in correspondence to at least one of identification information or device-related information. The function-related information list may include text or an image relating to a reception request such as specific firmware, firmware update information, a specific app, or app update information. When an event for selecting at least one of text and an image included in a service page occurs, the first electronic device 100 may transmit the function-related information request corresponding to the selected text or image to the service supporting device 300. Here, the function-related information request may occur by default. For example, function-related information included in a function-related information list may be transmitted to the first electronic device 100 without performing text or image selection from the function-related information list. The first electronic device 100 may deliver the received function-related information to the second electronic device 200.

The second electronic device 200 may communicate with the first electronic device 100. For example, the second electronic device 200 may communication with the first electronic device 100 through a short range communication channel. In an embodiment, at least one app or firmware may be installed on the second electronic device 200 during a manufacturing process. The second electronic device 200 may additionally receive function-related information from the first electronic device 100 through the communication channel formed with the first electronic device 100. The second electronic device 200 may install firmware, update firmware, install a new app, or update an installed app by processing the function-related information received from the first electronic device 100. In an embodiment, once at least one of firmware related processing or app related processing can be completed, the second electronic device 200 may output information output corresponding thereto or provide an information notification to the first electronic device 100:

As shown in the drawing, the second electronic device 200 may include a bracelet-type electronic device 204, a watch-type electronic device 203, a necklace-type electronic device 201, and a glasses-type electronic device 202, but, as mentioned above, may be at least one of various types or forms of electronic devices. An app or firmware for supporting each specific function can be to be installed or already installed on the second electronic device 200 such as the bracelet-type electronic device 204, the watch-type electronic device 203, the necklace-type electronic device 201, or the glasses-type electronic device 202. Additionally, the second electronic device 200 such as the bracelet-type electronic device 204, the watch-type electronic device 203, the necklace-type electronic device 201, or the glasses-type electronic device 202 may process updating an already installed app or firmware on the basis of the function-related information provided from the first electronic device 100. In relation to the second electronic device 200, installable firmware or apps may be the same or different in relation to each device characteristics. In an embodiment, in relation to the second electronic device 200, firmware update information or app update information processing may be the same or different in relation to each device characteristics.

Figure 2:
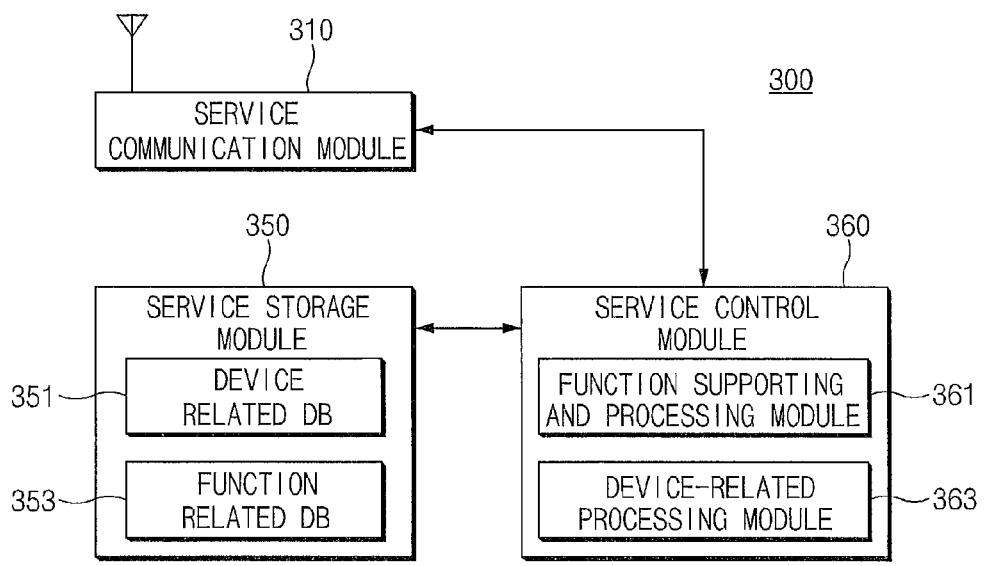
FIG. 2 is a block diagram illustrating an example service supporting device according to this disclosure.

FIG. 2 is a block diagram illustrating an example service supporting device according to this disclosure. Referring to FIG. 2, the service supporting device 300 may include a service communication module 310, a service storage module 350, and a service control module 360.

The service communication module 310 may support an access to the communication network 400. For example, the service communication module 310 may be an internet communication module. The service communication module 310 may maintain a connection state with the communication network 400 and may establish a network communication channel with the first electronic device 100. In an embodiment, the service communication module 310 may receive the identification information on the first electronic device 100 or the device-related information on the second electronic device 200. The service communication module 310 may deliver at least one of a function-related information list or function-related information to the first electronic device 100 in response to a control of the service control module 360. In an embodiment, the service communication module 310 may receive function-related information relating to specific firmware or app from another service supporting device or a device for providing and supporting an app or firmware. The received function-related information, for example, may be stored as a new app and firmware or their update information in the service storage module 350.

The service storage module 350 may store various programs and data relating to an operation of the service supporting device 300. In an embodiment, the service storage module 350 may include a device-related database 351 and a function-related database 353.

The device-related database 351 may store at least one of the identification information on the first electronic device 100 or device-related information. The identification information may include various information such as hardware information on the first electronic device 100, ID and password information corresponding to the first electronic device 100, and phone number information on the first electronic device 100. The identification information may be used for authenticating the first electronic device 100.

The device-related information, as mentioned above, may be information relating to the second electronic device 200 that the first electronic device 100 provides. In an embodiment, the device-related information may include central processing unit-type information on the second electronic device 200, for example, Arm or Intel. The device-related information may include device type information, for example, a watch type, a glasses type, and a general type. The device-related information may include a variety of information such as an operating system installed on the second electronic device 200, other platforms, and MAC information on the second electronic device 200. In an embodiment, firmware or an app may be manufactured in a format compatible with a specific platform or operating system or specific hardware during a manufacturing or updating process. In this regard, the device-related information may be used as information for distinguishing installable firmware or app.

In an embodiment, the device-related information may be linked with the identification information on at least one first electronic device 100 and stored. For example, a plurality of first electronic devices 100 may store the device-related information on the same second electronic device 200 in the device-related database 351 in correspondence to each identification information on the plurality of first electronic devices 100. Additionally, device-related information on the plurality of second electronic devices 200 may correspond to the identification information on one first electronic device 100 and can be stored in the device-related database 351.

The function-related database 353 may store at least one function-related information. In an embodiment, the function-related database 353 may store various apps such as at least one game app, utility app, or communication app. Apps stored in the function-related database 353 may be provided to the first electronic device 100 in response to an information request of the first electronic device 100. The function-related database 353 may store an app that the service communication module 310 receives. In an embodiment, the function-related database 353 may store an app created by the service communication module 300.

In an embodiment, the function-related database 353 may include an integrated app (or a package, a program package, a collaborative program installation file, or a complex program installation file (hereinafter referred to as an integrated app)). The integrated app may be an app supporting a collaborative function between the first electronic device 100 and the second electronic device 200, for example. The integrated app may include some data installed on the second electronic device 200 and can be designed to perform a function through the first electronic device 100 (for example, routines including at least one instruction set or statements for executing an instruction set or at least one programming function) and some data (for example, routines) to be applied to the first electronic device 100. The integrated app may include data corresponding to a main app to be applied to the first electronic device 100 and data corresponding to a sub app to be applied to the second electronic device 200.

In an embodiment, the integrated app may be a messenger app and may include first messenger app data applied to a main app of the first electronic device 100 and second messenger app data corresponding to a sub app executed in the second electronic device 200. The first messenger app data may include routines relating to a messenger executed in the first electronic device 100. The second messenger app data may include routines relating to the collaboration with the first electronic device 100 while a messenger function is supported.

For example, the second messenger app data may include routines relating to communication with the first electronic device 100 and routines corresponding to some functions of a messenger executed in the second electronic device 200. In the integrated app, the second messenger app data may be configured with some routines of the first messenger app data or some units. Once the integrated app is delivered to the first electronic device 100, the electronic device 100 may detect some data (for example, routines) corresponding to a sub app applied to the second electronic device 200 and then may deliver the detected some data to the second electronic device 200. The first electronic device 100 may install the main app thereon by using data (for example, routines) to be applied to the first electronic device 100 itself.

In an embodiment, the function-related database 353 may store update information on a specific app. The update information on an app may vary depending on characteristics of an electronic device. For example, even if an app supports the same function, the amount or arrangement of data of a program may vary during design and implementation processes in correspondence to device characteristics of the second electronic device 200. In an embodiment, even though an app supports the same function, the amount or arrangement of data of a program may vary depending on a type of the second electronic device 200. Correspondingly, different app update information may be prepared by each app installed on the first electronic device 100 and the second electronic device 200. The function-related database 353 may store app update information for each electronic device. Additionally, the function-related database 353 may store update information on an integrated app. The function-related database 353 may store information on an app installable on the first electronic device 100 and information on an integrated app installable on the second electronic device 200. Accordingly, when accessing the first electronic device 100, the second electronic device 200 may receive function-related information relating to installation of an integrated app from the first electronic device 100.

In an embodiment, the function-related database 353 may store firmware of a specific electronic device, firmware update information, hardware update information, operating system update information, and specific platform update information. For example, the firmware may include firmware relating to the first electronic device 100 and firmware relating to at least one second electronic device 200. For example, the operating system update information may include operating system update information installed on the first electronic device 100 and operating system update information installed on the second electronic device 200.

The information stored in the function-related database 353 may be delivered in a binary format to the first electronic device 100 or may be delivered to the second electronic device 200 through the first electronic device 100.

The service control unit 360 may perform signal processing and data processing relating to operations of the service supporting device 300. For example, the service control module 360 may perform an access control for the first electronic device 100, a processing control relating to identification information and device-related information, or a providing control relating to function-related information on firmware or an app.

In an embodiment, the service control module 360 may include a function supporting and processing module 361 and a device-related processing module 363.

The function supporting and processing module 361 may perform an access control of the first electronic device 100. For example, the function supporting and processing module 361 may supply power of the service communication module 310 and may control access maintenance with the communication network 400. The function supporting and processing module 361 may confirm the identification information on the first electronic device 100 when the first electronic device 100 performs an access request through the communication network 400. In an embodiment, if there is an access request from the first electronic device 100, the function supporting and processing module 361 may perform an authentication operation for the first electronic device 100. The function supporting and processing module 361 may establish a communication channel with the first electronic device 100 through the communication network 400.

In an embodiment, the function supporting and processing module 361 may provide set service information (for example, a service page) to the first electronic device 100. The function supporting and processing module 361 may perform a control to include function-related information or a function-related information list relating to at least one of firmware or an app executable on the first electronic device 100 in service information.

In an embodiment, the function supporting and processing module 361 may receive device-related information from the first electronic device 100. The function supporting and processing module 361 may deliver the identification information on the first electronic device 100 and device-related information to the device-related processing module 363. The function supporting and processing module 361 may receive function-related information applicable to at least one of the first electronic device 100 and the second electronic device 200 from the device-related processing module 363. The function supporting and processing module 361 may provide function-related information that the device-related processing module 363 to the first electronic device 100. For example, the function supporting and processing module 361 may distinguish function-related information applicable to each of the plurality of second electronic devices 200 and may provide the distinguished function-related information to the first electronic device 100.

In an embodiment, the function supporting and processing module 361 may configure function-related information applicable to the first electronic device 100 as a list and then may provide the list to the first electronic device 100. In an embodiment, the function supporting and processing module 361 may configure function-related information applicable to each of the first electronic device 100 and the second electronic device 200 as a list and then may provide the list to the first electronic device 100. In an embodiment, the function supporting and processing module 361 may configure function-related information applicable to the second electronic device 200 as a list and then may provide the list to the first electronic device 100.

In an embodiment, upon receipt of an input signal for selecting specific function-related information from the first electronic device 100, the function supporting and processing module 361 may transmit the selected function-related information to the first electronic device 100. In an embodiment, the function supporting and processing module 361 may transmit specific function-related information to the first electronic device 100 by default without a request from the first electronic device 100. For example, the function supporting and processing module 361 may transmit update information on specific firmware or app installed on at least one of the first electronic device 100 and the second electronic device 200 by default or in correspondence to an access of the first electronic device 100.

In an embodiment, the function supporting and processing module 361 may receive a request for new function-related information delivery in correspondence to new firmware arrangement or firmware update, or app update or new app arrangement from the device-related processing module 363. The function supporting and processing module 361 may provide function-related information or a function-related information list to the first electronic device 100 on the basis of the identification information on the first electronic device 100 that the device-related processing module 363 provides. In at least this operation, the function supporting and processing module 361 may provide the function-related information to the first electronic device 100 by a push type or a default type. In an embodiment, the function supporting and processing module 361 may provide function-related information and a function-related information list if an access of the corresponding first electronic device 100 occurs. In an embodiment, the function supporting and processing module 361 may notify the first electronic device 100 that there is function-related information to be received and may provide function-related information or a function-related information list to the first electronic device 100 in correspondence to whether the first electronic device 100 provides permission.

The device-related processing module 363 may control updating the device-related database 351. The function supporting and processing module 361 may receive the identification information on the first electronic device 100 and device-related information from the device-related processing module 363. The device-related processing module 363 may update the stored device-related information if there is a difference in device-related information after comparing the received identification information and the stored information. In an embodiment, the device-related processing module 363 may select function-related information if there is a difference in the device-related information. For example, if new device-related information is confirmed, the device-related processing module 363 may confirm function-related information applicable to the second electronic device 200 corresponding to the corresponding device-related information in the function-related database 353. The device-related processing module 363 may provide a list for the confirmed function-related information to the function supporting and processing module 361.

In an embodiment, the function-related processing module 363 may confirm that there is a new firmware arrangement, firmware update information, app update information, or new app arrangement of the function-related database 353. When at least one of new firmware arrangement, firmware update information, app update information, and new app arrangement occurs, the device-related processing module 363 can confirm device-related information by confirming the device-related database 351. The device-related processing module 363 may select the first electronic device 100 and the second electronic device 200, which can be required to receive at least one of new firmware arrangement, firmware update information, app update information, and app installation information, on the basis of the device-related information. The device-related processing module 363 may deliver the identification information on the first electronic device 100 and function-related information to the function supporting and processing module 361 in correspondence to a selection result. Here, the device-related processing module 363 may generate a function-related information list including items corresponding to function-related information. After delivering the list to the function supporting and processing module 361, the device-related processing module 363 may provide function-related information in response to a request.

In an embodiment, the device-related processing module 363 may process device-related information on the second electronic device 200, which is redundantly registered in a plurality of identification information. For example, information on the second electronic device included in the device-related information that the first electronic device 100 accesses and provides may be identical to pre-stored information on the second electronic device 200 connected to another first electronic device 100. The device-related processing module 363 may perform a comparison operation on device-related information. The device-related processing module 363 may update lower version device-related information with higher version device-related information if a comparison result is not identical. In an embodiment, the device-related processing module 363 may update pre-stored device-related information with the latest device-related information.

In an embodiment, the service supporting device 300 may include the service communication module 310 receiving the identification information on the first electronic device 100 and device-related information on the second electronic device 200 and the service control module 360 delivering at least one of function-related information and a function-related information list installable or updatable on the second electronic device 200 in response to the device-related information to the first electronic device 100 on the basis of the identification information.

In an embodiment, the service supporting device 300 may further include the service storage module 350 storing at least one of the function-related information, the identification information, and the device-related information.

In an embodiment, when new function-related information can be stored in the service storage module 350, the service control module 360 may select the second electronic device 200 to which the new function-related information is transmitted based on the device-related information and may transmit the new function-related information to the first electronic device 100.

In an embodiment, the service control module 360 may transmit a package including some routines to be applied to the second electronic device 200 and some routines to be applied to the first electronic device 100 to the first electronic device 100 in response to a request of the first electronic device 100, so as to allow the second electronic device 200 to perform a function through the first electronic device 100.

Figure 3:
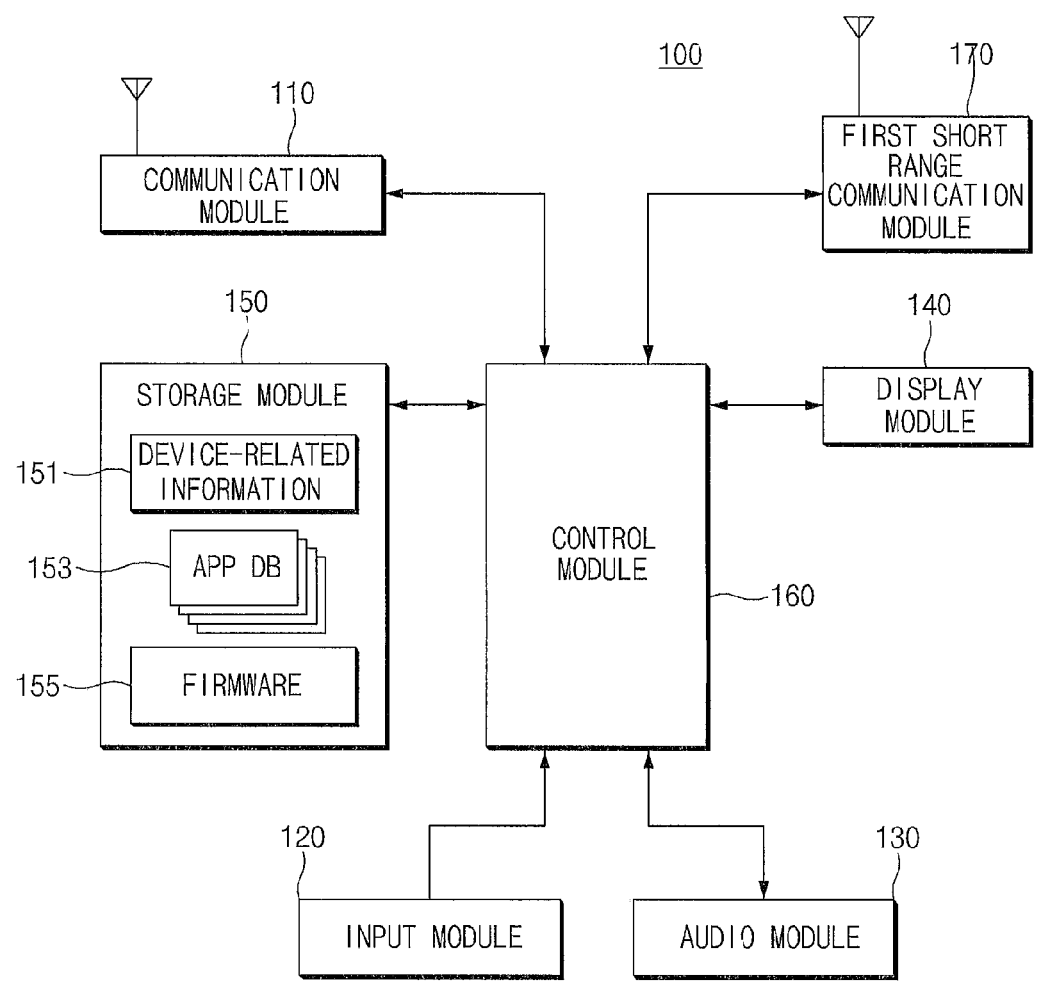
FIG. 3 is a block diagram relating to an example first electronic device management method according to this disclosure.

FIG. 3 is a block diagram relating to an example first electronic device according to this disclosure.

Referring to FIG. 3, the first electronic device 100 can include a communication module 110, an input module 120, an audio module 130, a display module 140, a storage module 150, a control module 160, and a first short range communication module 170.

The first electronic device 100 having such a configuration may establish a communication channel with at least one second electronic device 200 through the first short range communication module 170. The first electronic device 100 may receive device-related information from the second electronic device 200. The first electronic device 100 may access the service supporting device 300 by establishing a communication channel with the communication network 400 through the communication network 400. The first electronic device 100 may provide device-related information to the service supporting device 300 and may receive function-related information corresponding to the device-related information. The first electronic device 100 may deliver the received function-related information to the second electronic device 200. As disclosed herein, the first electronic device 100 may support function management such as app or firmware installation and management of at least one second electronic device 200, which can be incapable of accessing the service supporting device 300 or can have various limitations such as communication performance limitation and battery limitation during an access operation of the service supporting device 300.

The communication module 110 may establish a communication channel with the communication network 400. The communication module 110 may be a module communicating with the communication network 400, for example, an internet communication module. Additionally, the communication module 110 may be a communication module using a Public Switched Telephone Network (PSTN) in correspondence to characteristics of various communication networks 400. Additionally, the communication module 110 may be a mobile communication module accessible to a mobile communication network. The communication module 110 may support at least one of text data, audio data, and image data. In an embodiment, the communication module 110 may support communication channel establishment according to an access of the service supporting device 300. The communication module 110 may transmit a message requesting function-related information in correspondence to a control of the control module 160 on the basis of the identification information on the first electronic device 100 and device-related information received from the second electronic device 200.

The communication module 110 may receive at least one of a function-related information list and function-related information from the service supporting device 300. In at least this operation, the communication module 110 may receive a service page including function-related information or a function-related information list. The communication module 110 may receive at least one of firmware information, firmware update information, app installation information, and app update information applicable to at least one of the first electronic device 100 and the second electronic device 200 or a list thereof, by default, when accessing the service supporting device 300, or in response to a user input.

The input module 120 may generate an input signal of the first electronic device 100. The input module 120 may include at least one of a key pad, a dome switch, a touch pad (e.g., a resistive/capacitive type), a jog wheel, and a jog switch. The input module 120 may be implemented in a button form on the outside of the first electronic device 100, and some buttons may be implemented with a touch panel.

The input module 120 may include a plurality of keys for receiving number or text information and setting various functions. Such keys may include a menu load key, a screen on/off key, a power on/off key, and a volume control key. The input module 120 may generate an input signal for requesting short range communication channel establishment with the second electronic device 200, an input signal for requesting an access of the service supporting device 300, and an input signal corresponding to a specific function-related information selection in response to a user control. The input module 120 may generate an input signal for requesting disconnection with the service supporting device 300 and an input signal relating to device-related information editing in response to a user control. If there is a plurality of second electronic devices 200, the device-related information may include information on each of the second electronic devices 200. The input module 120 may generate an input signal for selecting a specific item to stop function management from the device-related information or an input signal for selecting an item corresponding to the second electronic device 200 that is to perform new function management. The generated input signal may be delivered to the control module 160 and then may operate as an instruction or an instruction set relating to a corresponding function performance.

The audio module 130 may process an audio signal of the first electronic device 100. For example, the audio module 130 may output an audio signal inputted from the control module 160 through a speaker. The audio module 130 may collect an audio signal such as voice inputted from a microphone (MIC) and then may deliver the collected audio signal to the control module 160. In an embodiment, the audio module 130 may output a guide sound for short range communication channel establishment between the first electronic device 100 and the second electronic device 200 and a guide sound for device-related information reception of the second electronic device 200. The audio module 130 may output a guide sound for access of the service supporting device 300, an audio signal for function-related information request, and a guide sound for function-related information reception. The audio module 130 may output a guide sound relating to delivering the received function-related information to the second electronic device 200 and a guide sound corresponding to function-related information delivery completion. The above guide sound may be replaced with a predetermined effect sound. The guide or effect sound output of the audio module 130 may be omitted in correspondence to a user setting or whether a system supports the sound output.

The display module 140 can display (outputs) information processed in the first electronic device 100. For example, when the first electronic device 100 is in a call mode, the first electronic device can display a call related user interface (UI) or graphic user interface (GUI). Additionally, when the first electronic device 100 is in a video call mode or a capturing mode, the display module 140 can display a captured or received image, a UI, or a GUI. The display module 140 can display an execution screen for various functions (or applications) executed in the first electronic device 100. Then, the display module 140 can activate a virtual input device (for example, a virtual touchpad) in response to a control of the control module 160 and can display the activated virtual input device on the execution screen, and then, can deliver a signal inputted through the virtual input device to the control module 160.

In an embodiment, the display module 140 may output a search screen where at least one second electronic device 200 is searched and a display screen of device-related information received from the second electronic device 200. The display module 140 may output a service page that the service supporting device 300 provides. The service page may include all function-related information that the service supporting device 300 is capable of providing. In an embodiment, the service page may include function-related information applicable to the first electronic device 100. In an embodiment, the service page may include function-related information corresponding to device-related information that the first electronic device 100 provides. The service page may include a virtual key button corresponding to a function-related information reception request. The display module 140 may output a specific function-related information reception progressing screen and a screen corresponding to an operation of delivering the received function-related information to the second electronic device 200.

The display module 140 may support a screen display in a landscape mode in correspondence to a rotation direction (or a laid direction) of the first electronic device 100, a screen display in a portrait mode, and a screen switching display according to a change between a landscape mode and a portrait mode. The display module 140 may include at least one of a liquid crystal display (LCD), a thin film transistor liquid crystal display (TFT LCD), an organic light-emitting diode (OLED), an active matrix OLED (AMOLED), a flexible display, a bended display, and a 3D display. Among them, some displays may be implemented with a transparent display of a transparent or optical transparent type so that it can be possible to see the outside.

Additionally, the display module 140 may be prepared as a touch screen having a touch panel and thus, can be used as an input device in addition to an output device. The touch panel may be configured to convert changes in pressure applied to a specific portion of the display module 140 or changes in capacitance occurring at a specific portion of the display unit 140 into electrical input signals. The touch panel may be configured to detect a pressure at the time of a touch in addition to a position and area touched. Moreover, as disclosed herein, the display module 140 can be configured to include a touch panel and a display panel. The touch panel may be placed on the display panel. The touch panel may be implemented by using an add-on type disposed on the display panel, or an on-cell type or an in-cell type inserted in the display panel. The touch panel can deliver a user input responding to a user's gesture for the display module 140 to the control module 160. Here, a user input resulting from a touch means such as a finger or a touch pen may include touch, multi touch, tap, double tap, long tap, tap & touch, drag, flick, press, pinch in, and pinch out. The above-mentioned user input generation may be supported when the device output module 240 of the second electronic device 200 operates as an input means. The above-mentioned various user inputs may collect device-related information on the second electronic device 200 by controlling the first electronic device 100 and may be applied to menu selection or item selection during an operation of transmitting the collected device-related information to the service supporting device 300. In an embodiment, the above-mentioned various user units may be applied to menu selection or item selection during an operation of delivering specific function-related information to the second electronic device 200.

The storage module 150 may store a program, firmware, or an app, which relate to the processing and control of the control module 160. The storage module 150 may temporarily store input/output data such as phone numbers, messages, audio or media contents (for example, music files and video files), and apps. In an embodiment, the storage module 150 may store device-related information 151, at least one app 153, and firmware 155.

The device-related information 151 may be information relating to at least one second electronic device 200. The device-related information 151 may include firmware relating to each second electronic device 200, app state information, and device characteristic information. The device-related information 151 may be received from the second electronic device 200 and stored. The device-related information 151 may be updated in correspondence to a state change of the second electronic device 200 or hardware replacement or addition. In an embodiment, the device-related information 151 may be provided to the service supporting device 300 periodically in correspondence to at least one of an access of the service supporting device 300, a request of the service supporting device 300, or a user input.

At least one app 153 may correspond to an application program installed on the first electronic device 100. At least one app 153 may include at least one of various apps such as a search app, a game app, a message app, and a communication app. In an embodiment, the at least one app 153 may include a store app supporting function management in at least one of the first electronic device 100 and the second electronic device 200.

The store app may include a routine (an instruction set, statements relating to instruction set execution, and a programming function) for providing function execution related icons or menus to the display module 140 and a routine for performing the connection of the service supporting device 300 when a corresponding icon or menu can be selected. The store app may include a routine for processing the reception and output of a service page that the service supporting device 300 provides and a routine for processing the reception and output of specific function-related information and a function-related information list by default or in response to a user selection. In an embodiment, the store app may include an information collecting routine for collecting device-related information on at least one second electronic device 200 and a routine for providing the collected or pre-stored device-related information 151 to the service supporting device 300. The information collecting routine may include a routine for searching a first short range communication module based surroundings periodically or in response to a user input, a routine for obtaining device-related information on the second electronic device 200 where a short range communication channel is established, and a routine for outputting the obtained device-related information. Additionally, the information collecting routine may include a routine for storing device-related information on the second electronic device 200 in the storage module 150 in relation to function management in response to a user input or by default.

The at least one app 153 may include an integrated app collaborating with an app installed on the second electronic device 200. The integrated app may be an app arranging some of program routines packaged to support a specific function in each of the first electronic device 100 and the second electronic device 200. The integrated app may be in an activated state in the first electronic device 100 and may be in a deactivated state in the second electronic device 200 in correspondence to an operating environment of electronic devices. In an embodiment, the integrated app may be in an activated state in the first electronic device 100 and the second electronic device 200, for example. A packaged program routine corresponding to the integrated app may be stored in the first electronic device 100. Then, upon accessing the second electronic device 200, data for the second electronic device 200 in a packaged routine of a packaged program of the integrated app may be delivered from the first electronic device 100 to the second electronic device 200.

In an embodiment, a program routine relating to the first electronic device 100 among a packaged program routine of the integrated app may be installed on the first electronic device 100 and operate. Then, upon accessing the second electronic device 200, program routines relating to the second electronic device 200 may be delivered from the first electronic device 100 to the second electronic device 200. Some program routines of an integrated app pre-installed and operating on the first electronic device 100 may be updated for compatible function support with the second electronic device 200 while being installed on the second electronic device 200. For example, the first electronic device 100 may receive and install an integrated messenger program and may operate a messenger function. Then, upon accessing the second electronic device 200 and requesting integrated messenger program installation, the first electronic device 100 may change or update some program routines to support an integrated messenger function with the second electronic device 200.

During a process of installing the integrated messenger program, if the first electronic device 100 is connected to the second electronic device 200, the integrated messenger program may be installed to allow the first electronic device 100 and the second electronic device 200 to integrally support a messenger function. In this regard, the first electronic device may store data relating to the integrated app. Then, upon request, the first electronic device 100 may install functions for the integrated app on the basis of data for operating the first electronic device 100. Or, the first electronic device 100 may deliver some data of the integrated app to the second electronic device 200.

The above-mentioned storage module 150 may have at least one type of storage medium among a flash memory type, a hard disk type, a micro type, a card type (for example, a Secure Digital (SD) card type or an eXtream digital (XD) card type), a Random Access Memory (RAM) type, a Static RAM (SRAM) type, a Read-Only Memory (ROM) type, a Programmable ROM (PROM) type, an Electrically Erasable PROM (PROM) type, a Magnetic RAM (MRAM) type, a magnetic disk type, and an optical disk type. The first electronic device 100 may operate in relation to web storage performing a storage function of the storage module 150 on the internet.

Moreover, the embodiments disclosed herein may be implemented in a program instruction form executable through various computer means and recorded on a computer readable recording medium. The computer readable recording medium may include each or a combination of program instructions, data files, and data structures. The program instructions written on the recording medium may be especially designed and configured for the present invention or may be known to computer software engineers.

The first short range communication module 170 may be a module for supporting communication within a predetermined short range through a wired/wireless method. The short range communication method may include at least one of Bluetooth, Bluetooth Low Energy (BLE), Radio Frequency Identification (RFID), Infrared Data Association (IrDA), Ultra Wideband (UWB), ZigBee, and Near Field Communication (NFC).

The first short range communication module 170 may establish a short range communication channel with at least one second electronic device 200 and may receive device-related information from the second electronic device 200.

The first short range communication module 170 may further include a cable if implemented in a wired method. The cable may be disposed between the first short range communication module 170 and the second electronic device 200. The first short range communication module 170 may deliver function-related information and a function-related information list to the second electronic device 200. The activated or deactivated state of the first short range communication module 170 may be obtained in response to a control of the first electronic device 100, a request of the second electronic device 200, or a user input.

The control module 160 may perform the processing and delivery of various signals and the delivery and processing of data, which relate to a control of the first electronic device 100. For example, the control module 160 may control the connection and delivery of device-related information and the reception, processing, and delivery of function-related information. The control module 160 may include a configuration such as that shown in FIG. 4.

Moreover, the embodiments disclosed herein may be implemented on a computer or similar device readable recording medium by using software, hardware, or a combination thereof. In terms of hardware implementation, the embodiments disclosed herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, embodiments disclosed herein may be implemented by using the control module 160 itself. In terms of software implementation, embodiments such as procedures and functions disclosed herein may be implemented by using additional software modules. Each of the software modules may perform at least one function and operation described in this specification.

Figure 4:
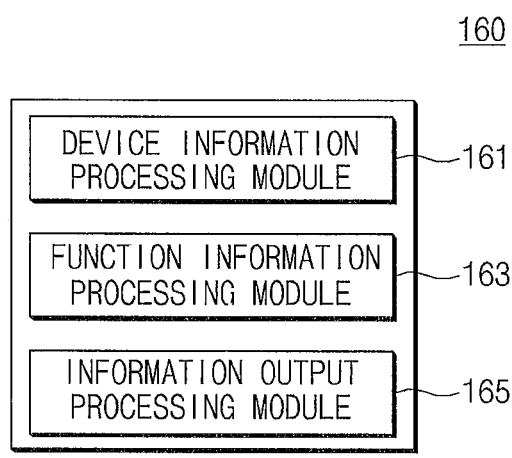
FIG. 4 is a block diagram relating to an example control module according to this disclosure.

FIG. 4 is a block diagram relating to an example control module according to this disclosure.

Referring to FIG. 4, the control module 160 can include a device information processing module 161, a function information processing module 163, an information output processing module 165.

The device information processing module 161 may control collecting device-related information on the second electronic device 200, storing device-related information, and transmitting device-related information.

In relation to the device-related information collection, the device information processing module 161 may control the activation of the first short range communication module 170. For example, the device information processing module 161 may activate the first short range communication module 170 in real time or in response to a user input. The device information' processing module 161 may activate the first short range communication module 170 periodically in response to pre-defined schedule information. The device information processing module 161 may perform a scan operation of the second electronic device 200 in response to a user input or an activation request. The device information processing module 161 may collect device-related information on the second electronic device 200 once at least one second electronic device 200 can be found. In this operation, the device information processing module 161 may transmit a message for requesting device-related information from the second electronic device 200 through the first short range communication module 170 and may receive a response message corresponding thereto. Or, the device information processing module 161 may receive device-related information from the second electronic device 200 during a search operation.

In an embodiment, the device information processing module 161 may receive a message for requesting short range communication channel establishment from the second electronic device 200. The device information processing module 161 may establish a communication channel of the second electronic device 200 if an input signal for allowing short range communication channel establishment is issued in correspondence to a corresponding message or by default. The device information processing module 161 may receive device-related information that the second electronic device 200 delivers through a short range communication channel.

In relation to the device-related information storage, the device information processing module 161 may store device-related information on the second electronic device 200, which requires function management among at least one second electronic device 200, in the storage module 150. The device information processing module 161 may confirm device-related information stored in the storage module 150 and may perform an updating operation if the device-related information is different from currently received device-related information. The device information processing module 161 may output a list of found second electronic devices 200. In at least this operation, the device information processing module 161 may classify a list of the second electronic devices 200 included in function management separately. The device information processing module 161 may also classify a list of the second electronic devices 200 not included in function management separately. Classification lists may be provided to the information output processing module 165.

In relation to the device-related information transmission, the device information processing module 161 may transmit device-related information to the service supporting device 300 in correspondence to various event occurrences relating to the device-related information transmission. In an embodiment, the device information processing module 161 may transmit device-related information to the service supporting device 300 when a user input for requesting device-related information transmission occurs. In an embodiment, the device information processing module 161 may transmit device-related information to the service supporting device 300 by default when an access of the service supporting device 300 occurs.

In an embodiment, upon receipt of a request of the service supporting device 300, the device information processing module 161 may transmit device-related information to the service supporting device 300. Additionally, after a communication channel is established with the second electronic device 200, upon receipt of device-related information from the second electronic device 200, the device information processing module 161 may transmit the received device-related information to the service supporting device 300. In an embodiment, when a request of the second electronic device 200 occurs, the device information processing module 161 may transmit device-related information to the service supporting device 2. In relation to the device-related information transmission to the service supporting device 300, the device information processing module 161 may control communication channel establishment with the service supporting device 300.

The device information processing module 161 may transmit the identification information on the first electronic device 100 and entire stored device-related information to the service supporting device 300 in an information transmission operation. In an embodiment, the device information processing module 161 may also transmit device-related information that a user designates to the service supporting device 300. In an embodiment, the device information processing module 161 may transmit device-related information and identification information corresponding to the second electronic device 200 requesting information transmission to the service supporting device 300.

The function information processing module 163 may control the processing and delivery of function-related information received from the service supporting device 300. Upon receipt of function-related information from the service supporting device 300, the function information processing module 163 may confirm information to be applied to the first electronic device 100 and information to be applied to the second electronic device 200 in the received function-related information. In an embodiment, if there is function-related information designed to be automatically processed in the first electronic device 100, the function information processing module 163 may process corresponding function-related information. For example, the function information processing module 163 may control applying firmware included in function-related information, updating firmware, newly installing a specific app, or updating a specific app.

In an embodiment, the function information processing module 163 may receive an input signal for selecting function-related information to be transmitted to the second electronic device 200 in the received function-related information. The function information processing module 163 may deliver function-related information selected by an input signal to the corresponding second electronic device 200. In an embodiment, the function information processing module 163 may confirm whether there is information corresponding to the second electronic device 200 establishing a current communication channel in the received function-related information. The function information processing module 163 may transmit corresponding function-related information to the second electronic device 200 by default.

In an embodiment, if there is function-related information to be automatically applied to the second electronic device 200 in the received function-related information, the function information processing module 163 may control transmitting corresponding information to the second electronic device 200. In at least this operation, if a communication channel is established with the second electronic device 200, the function information processing module 163 may perform a procedure relating to short range communication channel establishment. For example, the function information processing module 163 may process a search operation for the second electronic device 200 and an information transmitting/receiving operation relating to short range communication channel establishment.

In an embodiment, the function management of the second electronic device 200 may be designed to be activated after a communication channel between the first electronic device 100 and the second electronic device 200 is established. In at least this case, the function information processing module 163 may not perform an additional communication channel establishment operation. Moreover, In an embodiment, the first electronic device 100 may collect device-related information on the second electronic device 200 in advance and may perform an access of the service supporting device 300 in correspondence to a user input or preset schedule information. The first electronic device 100 may receive function-related information corresponding to the second electronic device 200 while a communication channel is not established with the second electronic device 200. In at least this case, the function information processing module 163 may not control communication channel establishment with the second electronic device 200.

The function information processing module 163 may provide a failure notification if communication channel establishment with the second electronic device 200 fails. The function information processing module 163 may perform a search operation for the second electronic device 200 again in correspondence to a user input. In an embodiment, the function information processing module 163 may perform a search operation for the second electronic device 200 on the basis of a set period and may control delivering function-related information if search and communication channel establishment can be successful. The function information processing module 163 may control releasing a short range communication channel established with the second electronic device 200 if the delivery of function-related information is completed. Additionally, the function information processing module 163 may support information reception relating to function-related information processing from the second electronic device 200 by controlling short range communication channel maintenance.

The information output processing module 165 may control an output of information relating to function management of the first electronic device 100 and an output of information relating to function management of the second electronic device 200. In an embodiment, the information output processing module 165 may output a screen relating to short range communication channel establishment. For example, the information output processing module 165 may output the identification information on at least one second electronic devices 200 found through the first short range communication module 170. The information output processing module 165 may output device-related information corresponding to the second electronic device 200. The information output processing module 165 may distinguish the second electronic device 200 registered as function management from the unregistered second electronic device 200 and then may output it. The information output processing module 165 may perform screen updating if the second electronic device 200 registered as function management is unregistered. If registration of the second electronic device 200 not registered as function management is requested, the information output processing module 165 may perform screen updating in correspondence thereto.

In an embodiment, the information output processing module 165 may output a screen corresponding to an access operation of the service supporting device 300. On accessing the service supporting device 300, the information output processing module 165 may receive and output a service page that the service supporting device 300 provides. The information output processing module 165 may receive and output a service page corresponding to device-related information transmitted to the service supporting device 300. In an embodiment, the information output processing module 165 may receive and output a service page including function-related information applicable to the first electronic device 100 and function-related information applicable to a plurality of second electronic devices 200. In an embodiment, the information output processing module 165 may receive and output a service page including function-related information applicable to a plurality of second electronic devices 200.

In an embodiment, the information output processing module 165 may receive and output a function-related information list. When an input event for selecting a specific item in the function-related information list occurs and corresponding function-related information is received from the service supporting device 300, the information output processing module 165 may output a screen for receiving function-related information corresponding to the selected item.

In an embodiment, the information output processing module 165 may output a screen relating to function-related information processing of the first electronic device 100. For example, the information output processing module 165 may output at least one of a firmware update completion screen of the first electronic device 100, a new app installation completion screen, and an existing app update completion screen.

In an embodiment, the information output processing module 165 may output a screen corresponding to an operation of delivering function-related information to the second electronic device 200. For example, the information output processing module 165 may receive a response signal corresponding to function-related information reception completion from the second electronic device 200 delivering the function-related information. The information output processing module 165 may output guide information corresponding to the received response signal through the display module 140 or the audio module 130.

In an embodiment, the information output processing module 165 may receive and output information on a function-related information application operation delivered from the second electronic device 200. For example, the information output processing module 165 may receive and output information on a processing state of specific function-related information in the second electronic device 200 and information on specific function-related information processing completion.

In an embodiment, the first electronic device 100 may include the first short range communication module 170 for establishing a communication channel for device-related information collection of at least one second electronic device 200, the communication module 110 for establishing a communication channel with a service supporting device, and the control module 160 for transmitting to the service supporting device 300 a message for requesting function-related information installable or updatable on the second electronic device 200 in correspondence to the device-related information and controlling transmission of identification information for the function-related information reception and the device-related information.

In an embodiment, the control module 160 may control the transmission of device-related information on the second electronic device 200 establishing a communication channel through the first short range communication module 170, to the service supporting device 300.

In an embodiment, the control module 160 may control the transmission of device-related information on the second electronic device 200 receiving a request for function management among a plurality of second electronic devices 200 establishing a communication channel through the first short range communication module 170 to the service supporting device 300.

In an embodiment, the first electronic device 100 may further include the storage module 150 for storing the collected device-related information and the control module 160 may transmit the device-related information stored in the storage module 150 to the service supporting device 300.

In an embodiment, the control module 160 may transmit device-related information selected by a user input in the stored device-related information to the service supporting device 300.

In an embodiment, the first electronic device 100 may include the communication module 110 receiving at least one of the function-related information list and the selected function-related information from the service supporting device 300 in response to a request for function-related information installable or updatable on the second electronic device 200, the control module 160 extracting information to be delivered to the second electronic device 200 in the received function-related information list and function-related information and delivering the extracted information to the second electronic device 200, and the first short range communication module 170 establishing a communication channel for delivering at least one of the function-related information and the function-related information list.

In an embodiment, the first electronic device 100 may further include the display module 140 for outputting the received function-related information list and the display module 140 may separately display a display item corresponding to function-related information applicable to each of the first electronic device 100 and the second electronic device 200 or may separately display app or firmware update information and installable app information on the second electronic device 200.

In an embodiment, upon receipt of a collaborative package between the first electronic device 100 and the second electronic device 200, the control module 160 may extract routines to be transmitted to the second electronic device 200 and may then transmit the extracted routines to the second electronic device 200 and also may control extracting and applying the routines to be applied to the first electronic device 100.

In an embodiment, the control module 160 may request function-related information corresponding to the selected item in the function-related information list from the service supporting device 300.

In an embodiment, the control module 160 may extract items to be transmitted to the second electronic device 200 from the function-related information list and may deliver corresponding items to each second electronic device 200.

In an embodiment, upon receipt of a specific function-related information request from the second electronic device 200, the control module 160 may transmit the received function-related information request to the service supporting device 300, receive corresponding function-related information, and deliver the received information to the second electronic device 200.

In an embodiment, the control module 160 may extract function-related information to be transmitted to the second electronic device 200 in the received function-related information and may automatically deliver the extracted function-related information to the second electronic device 200.

Moreover, in an embodiment, the first electronic device 100 may include the short range communication module 170 establishing a communication channel for device-related information collection of at least one second electronic device 200, the control module 160 confirming function-related information installable or updatable on the second electronic device 200 in correspondence to the device-related information, and the display module 140 displaying at least one of an app item uninstalled on the second electronic device 200, an integrated app item linked with the second electronic device 200, an un-installable item, or an app item installed on the second electronic device 200 in correspondence to installed app items.

Figure 5:
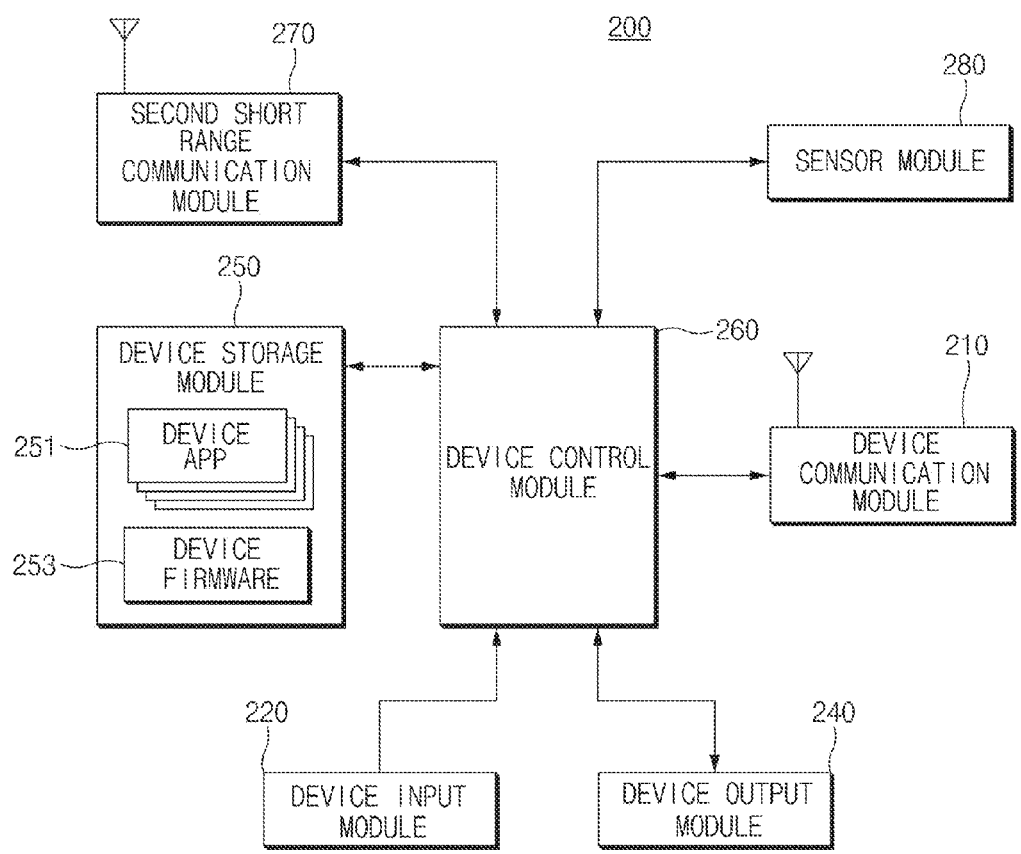
FIG. 5 is a block diagram relating to an example second electronic device management method according to this disclosure.

FIG. 5 is a block diagram relating to an example second electronic device according to this disclosure.

Referring to FIG. 5, the second electronic device 200 can include a device communication module 210, a device input module 220, a device output module 240, a device storage module 250, a second short range communication module 270, a sensor module 280, and a device control module 260.

The second electronic device 200 having a such a configuration may establish a communication channel (for example, a short range communication channel) with the first electronic device 100 and may transmit device-related information to the first electronic device 100. Then, the second electronic device 200 may receive function-related information through the first electronic device 100.

The device communication module 210 may establish a communication channel with a specific server device, for example, the service supporting device 300. The device communication module 210 may have a similar configuration to the communication module 110 of the first electronic device 100 shown in FIG. 4. Moreover, the device communication module 210 may be excluded from the second electronic device 200 according to a designer's intention or may be deactivated according to a user setting.

The device input module 220 may generate an input signal relating to a control of the second electronic device 200. The device input module 220 may be prepared in a similar form to the input module 120 shown in FIG. 4. The device input module 220 may generate an input signal relating to a turn-on and turn-off control of the second electronic device 200 and an input signal corresponding to function activation that the second electronic device 200 is capable of supporting. In an embodiment, the device input module 220 may generate an input signal relating to a function management request. The device input module 220 may support hot key allocation, virtual key button allocation, and specific gesture setting, which relate to the function management request. The device input module 220 may include a touch panel. In this case, the device input module 220 may generate an input signal relating to the function management request as touch gesture forms corresponding to the above-mentioned various user inputs. In an embodiment, the device input module 220 may include a sound collection device. A sound signal that the device input module 220 collects may be provided to the control module 260 and recognized as sound. A sound recognition result may be used as a specific input signal.

The device output module 240 may include at least one of a screen output module, an audio output module, and a vibration module. For example, the device output module 240 may output a standby screen and a support related screen such as a specific function, for example, a time display function, a weather display function, a message reception display function, and a call reception notification display function. In an embodiment, the device output module 240 may output an icon or menu item relating to a function management request. Once an event for selecting a corresponding icon or menu occurs, the device output module 240 may output a function management screen.

The function management screen may include at least one of a screen searching for the first electronic device 100 on the basis of the second short range communication module 270, a screen transmitting device-related information on the basis of a communication channel established with the first electronic device 100, a screen receiving function-related information corresponding to the device-related information, a function-related information reception completion screen, and a screen processing the function-related information. A function-related information processing screen may include a firmware update completion screen, an app installation screen, an app installation completion screen, and an app update completion screen on the basis of characteristics of function-related information.

In an embodiment, the device output module 240 may deliver function relation information reception state information and function-related information processing state information to the first electronic device 100. In an embodiment, the device output module 240 may output information relating to function management as pre-defined guide sound. Additionally, the device output module 240 may output information relating to function management through a vibration module.

The device storage module 250 may store a program and data relating to an operation of the second electronic device 200. For example, the device storage module 250 may store at least one of a device app 251 and a device firmware 253. At least one device app 251 may vary in correspondence to characteristics of a corresponding electronic device. In an embodiment, when the second electronic device 200 is a watch-type device, the device app 251 may include a time display function app, a D-day display function app, an alarm function app, and a call relay function app. In an embodiment, when the second electronic device 200 is a necklace-type device, the device app 251 may include a music playback app, a flash function app, and a picture display function app.

Various embodiments disclosed herein may not be limited to the above-mentioned function apps and the device app 251 having the same function may be installed on different types of devices. In at least this operation, while a basic function of the device app 251 installed in correspondence to a type of each second electronic device 200 is maintained, its extension functions or optional functions may be modified and installed. The device firmware 253 may vary based on hardware characteristics of the second electronic device 200.

The second short range communication module 270 may establish a short range communication channel with the first short range communication module 170 of the first electronic device 100 in correspondence to a request of the first electronic device 100 or a control of the device control module 260. The second short range communication module 270 may transmit device-related information on the second electronic device 200 to the first electronic device 100. The second short range communication module 270 may receive function-related information corresponding to the device-related information. Here, the function-related information may include at least one of firmware, firmware update information, app installation information, and app update information, which relate to the second electronic device 200. The app installation information and the app update information may include information relating to an integrated app. In an embodiment, the second short range communication module 270 may be a communication module supporting a Bluetooth communication method. In an embodiment, the second short range communication module 270 may be a communication module supporting data transmission through a cable.

The sensor module 280 may generate a sensor signal corresponding to an operation of the second electronic device 200. For example, the sensor module 280 may include at least one of various sensors, for example, a touch detection sensor, a pressure detection sensor, an acceleration sensor, a geomagnetic sensor, a gyro sensor, a temperature detection sensor, an air pressure detection sensor, and an illumination detection sensor. Additionally, the sensor module 280 may include at least one of a gesture sensor, a proximity sensor, a pressure sensor, a magnetic sensor, a grip sensor, a red, green, blue (RGB) sensor, a biometric sensor, a humidity sensor, an ultra violet (UV) sensor, and a hole sensor. Additionally, the sensor module 180 may measure physical quantities or detect an operating state of an electronic device, and may convert the measured or detected information into electrical signals. Additionally, the sensor module 180 may include an E-nose sensor, an electromyography (EMG) sensor, an electroencephalogram (EEG) sensor, an electrocardiogram (ECG) sensor, or a fingerprint sensor. Additionally, the sensor module 280 may further include a control circuit for controlling at least one sensor included in the above-mentioned various sensors. For example, the second electronic device 200 may detect the brightness of surrounding by using an illumination sensor. As another example, the second electronic device 200 may confirm a physical form change of an electronic device by using a gesture sensor, a proximity sensor, or a hole sensor.

A sensor signal that the sensor module 280 generates in correspondence to an operation of the second electronic device 200 may be delivered to the device control module 260 and used as a specific input signal. For example, a sensor signal corresponding to a movement in a predetermined direction of the second electronic device 200 may be applied as an input signal requesting function management execution described in various embodiments of the present invention. In an embodiment, a sensor signal generated from the sensor module 280 may be applied as an input signal indicating function-related information sharing between the second electronic devices 200. The above-mentioned sensor module 280 may be excluded from the second electronic device 200 in correspondence to a design method.

The device control module 260 may control the establishment of a communication channel (for example, a short range communication channel) with the first electronic device 100. The device control module 260 may control the transmission of device-related information relating to the second electronic device 200 and the reception of a function-related information list. The device control module 260 may control function-related information processing and function-related information sharing.

Figure 6:
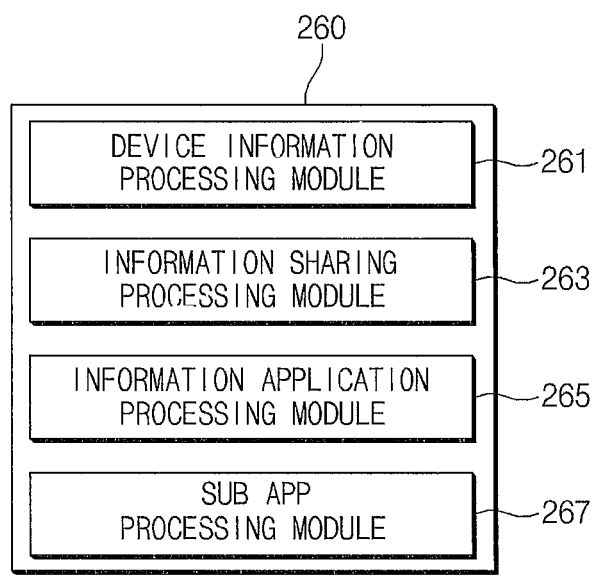
FIG. 6 is a block diagram illustrating an example configuration of a device control module according to this disclosure.

FIG. 6 is a view illustrating an example configuration of a device control module according to this disclosure.

Referring to FIG. 6, the device control module 260 may include an information transmission processing module 261, an information sharing processing module 263, an information application processing module 265, and a sub app processing module 267.

Once an event relating to a function management request occurs, the information transmission processing module 261 may activate the first short range communication module 270 so as to establish a short range communication channel with the first electronic device 100. The event relating to a function management request may occur by at least one of a pre-defined specific key button selection signal, a pre-defined specific virtual key button selection signal, a sound input signal, and a preset motion sensor signal. In an embodiment, the event relating to a function management request may occur periodically according to pre-defined schedule information or by the execution of an app installed on the second electronic device 200. Once the event relating to a function management request occurs, the information transmission processing module 261 may deliver device-related information to the first electronic device 100 through an established short range communication channel.

In an embodiment, the information transmission processing module 261 may maintain the second short range communication module 270 in a standby state and at the short range communication channel establishment request of the first electronic device 100, may establish a short range communication channel in response to the request of the first electronic device 100. The information transmission processing module 261 may receive a device-related information request from the first electronic device 100 through the established short range communication channel. The information transmission processing module 261 may deliver device-related information to the first electronic device 100 in correspondence to a device-related information request.

The information application processing module 265 may receive function-related information or a function-related information list from the first electronic device 100. At this point, the received function-related information and function-related information list may be information corresponding to the device-related information on the second electronic device 200. For example, the function-related information and function-related information list received from the first electronic device 100 may include information relating to an app or firmware applicable to the second electronic device 200.

The information application processing module 265 may apply function-related information including at least one of a received app or firmware, app update information, or firmware update information, by default. For example, the information application processing module 265 may control installing a received app or updating firmware. In an embodiment, the information application processing module 265 may output a function-related information list through the device output module 240. The information application processing module 265 may transmit a function-related information request selected by the device input module 220 in the first related information list to the first electronic device 100. Upon receipt of the function-related information from the first electronic device 100, the device control module 260 may install or update the received function-related information.

The sub app processing module 267 may receive some data corresponding to a sub app to be applied to the second electronic device 200 from the service supporting device 300 or the first electronic device 100. The sub app processing module 267 may install a sub app relating to an integrated app by using the received data. In an embodiment, the sub app processing module 267 may update a communication method setting and data processing method of a pre-installed sub app by using some data of an integrated app received from the service supporting device 300 or the first electronic device 100. Once the installation or update of a sub app can be performed, the sub app processing module 267 may deliver a performance result to at least one of the first electronic device 100 or the service supporting device 300. Here, the sub app processing module 267 may perform a user confirmation operation before sub app installation or update. In an embodiment, the sub app processing module 267 may perform sub app installation or update automatically.

Once an event relating to a function-related information sharing occurs, the information sharing processing module 263 may activate the second short range communication module 270 so as to establish a short range communication channel with another type of the second electronic device 200. For example, once a specific sensor signal occurs, the information sharing processing module 263 may control another second electronic device search and short range communication channel establishment through the second short range communication module 270. The information sharing processing module 263 may confirm a device collecting a sensor signal identical to a sensor signal occurring from another second electronic device connected to a short range communication channel. In at least this operation, the information sharing processing module 263 may transmit a confirmation message corresponding to whether there can be a device collecting a sensor signal in other second electronic devices to the other second electronic devices.

If there is a device collecting the same sensor signal, the information sharing processing module 263 may control function-related information sharing with a corresponding second electronic device. The information sharing processing module 263 may request device-related information on another second electronic device. The information sharing processing module 263 may confirm app state information or firmware state information in the device-related information. If app state information or firmware state information on the other side second electronic device has a lower version than that on the information sharing processing module 263 or is in an uninstalled state, the information sharing processing module 263 may deliver corresponding information to the other side second electronic device. In an embodiment, if function-related information on the other side second electronic device has a higher version than that on the information sharing processing module 263 or is an uninstalled program, the information sharing processing module 263 may request the delivery of corresponding function-related information from the other side second electronic device. Upon receipt of function-related information, the information sharing processing module 263 may deliver the function-related information to the information application processing module 265 and may request applying or installing the delivered function-related information to each app or firmware. Here, the information sharing processing module 263 may perform a user confirmation operation before function-related information sharing. In an embodiment, the information sharing processing module 263 may automatically perform function-related information sharing without an additional user confirmation operation.

According to various embodiments of the present invention, if function-related information sharing between second electronic devices occurs, the information sharing processing module 263 may transmit updated device-related information in correspondence to a function-related information change to the first electronic device 100. The information sharing processing module 263 may establish a short range communication channel with the first electronic device 100 and may deliver updated device-related information to the first electronic device 100. The delivery of the updated device-related information may be performed by each of the second electronic devices 200. Here, in relation to the updated device-related information reception, first electronic devices connected to each second electronic device may be the same devices. Or, first electronic devices receiving updated device-related information may be different devices.

In an embodiment, function management of the second electronic device 200 may be performed by various first electronic devices or a pre-defined specific first electronic device. For example, the function management of the second electronic device 200 may establish a short range communication channel, and may be accomplished at the request of the various first electronic devices 100 accessible to the service supporting device 300. In an embodiment, in response to the request of the second electronic device 200, the function management may be accomplished by one first electronic device 100 among first electronic devices around. In an embodiment, the function management may be accomplished by a pre-designated specific first electronic device 100 among first electronic devices around or a first electronic device 100 corresponding to a user selection.

In an embodiment, the second electronic device 200 can include the second short range communication module 270 establishing a short range communication channel and the device control module 260 delivering device-related information to the first electronic device 100 through the short range communication channel and receiving at least one of installable or updatable function-related information and a function-related information list that the service supporting device 300 provides in correspondence to the device-related information.

In an embodiment, once a specified user input or motion signal occurs, the device control module 260 may establish the short range communication channel and transmit the device-related information to the first electronic device 100.

In an embodiment, the second electronic device 200 may further include the device output module 240 outputting the function-related information list.

In an embodiment, when a specific item is selected from the function-related information list, the device control module 260 may transmit a selection event to the first electronic device and may receive function-related information corresponding to the selection event from the first electronic device.

In an embodiment, the device output module 240 may separately display an installable app item, an update information item of an app or firmware, and an installed app item.

In an embodiment, the device control module 260 may control transmitting the function-related information processing result to the first electronic device.

In an embodiment, the second electronic device 200 can include the second short range communication module 270 establishing a short range communication channel with another second electronic device, the device control module 260 receiving device-related information from the other second electronic device through the short range communication channel and comparing the received device-related information and its device-related information to output an installable or updatable function-related information list, and the device output module 240 outputting the function-related information list.

In an embodiment, the second electronic device 200 can further include the sensor module 280 generating a pre-defined motion sensor signal and the device control module 260 may establish a short range communication channel with another second electronic device generating a pre-defined motion sensor signal and may exchange device-related information.

Figure 7:
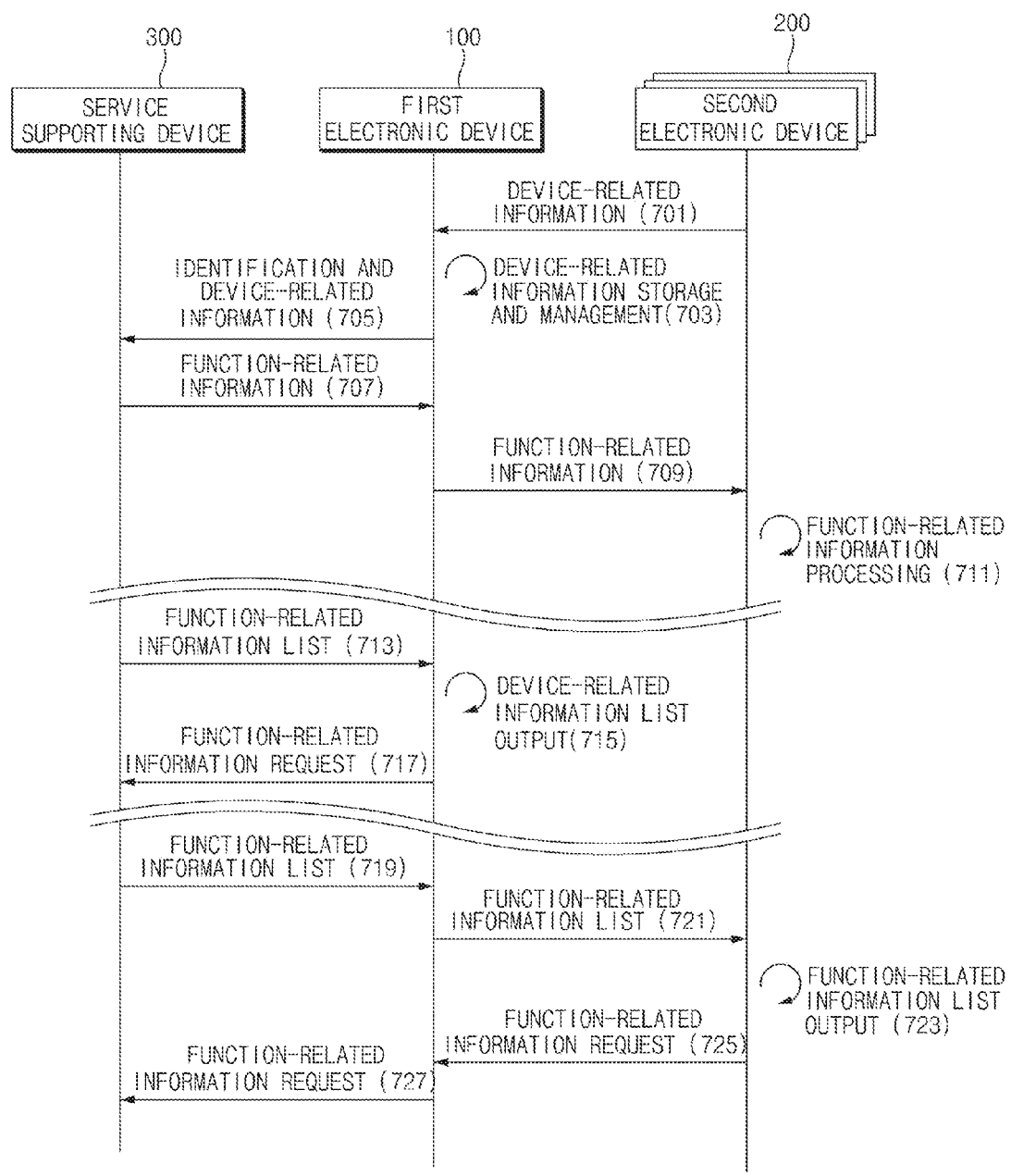
FIG. 7 is a flowchart illustrating an example data processing method according to this disclosure.

FIG. 7 is a flowchart illustrating an example data processing method according to this disclosure.

Referring to FIG. 7, in relation to a data processing system operation, at least one second electronic device 200 may deliver device-related information to the first electronic device 100 in operation 701. Here, the second electronic device 200 may establish a communication channel with the first electronic device 100. The communication channel may be at least one of wired and wireless methods. The communication channel establishment may be performed by a request of the first electronic device or a request of the second electronic device 200. In operation 703, the first electronic device 100 may perform device-related information storage and management. The first electronic device 100 may store device-related information and may perform update confirmation periodically.

In an embodiment, the first electronic device 100 may collect device-related information on the second electronic device 200 at the request of an access to the service supporting device 300. In this process, the first electronic device 100 may confirm whether there can be updated information by comparing the collected device-related information and previously stored device-related information on the second electronic device 200. Then, if there is updated information, the first electronic device 100 may control updating previously stored device-related information.

In an embodiment, when an event for requesting an access to the second electronic device 200 occurs, the first electronic device 100 may collect device-related information on the second electronic device 200. The first electronic device 100 may compare the device-related information that the second electronic device 200 provides and the previously stored device-related information and may determine whether to update information. In an embodiment, the first electronic device 100 may establish a communication channel with the second electronic device 200 at a pre-defined predetermined period or a predetermined time and may collect device-related information. Here, the predetermined time may be a specific time or a specific data. In an embodiment, when device-related information update occurs, when the second electronic device 200 is designed to transmit the device-related information update to the first electronic device 100, the first electronic device 100 may additionally postpone additional device-related information update. The first electronic device 100 may perform device-related information update in correspondence to an update notification of the second electronic device 200.

In operation 705, the first electronic device 100 may transmit at least one of identification information and device-related information to the service supporting device 300. In an embodiment, the first electronic device 100 may establish a communication channel with the service supporting device 300 in correspondence to a user input. In an embodiment, upon receipt of device-related information or a function management request from the second electronic device 200, the first electronic device 100 may establish a communication channel with the service supporting device 300.

In an embodiment, the first electronic device 100 may deliver device-related information to the service supporting device 300. In this operation, the first electronic device 100 may deliver device-related information designated by a user input or relating to at least one specific second electronic device establishing a current communication channel in entire stored device-related information or device-related information, to the service supporting device 300.

For example, the first electronic device 100 may store device-related information corresponding to various second electronic devices 200, for example, a watch type second electronic device, a necklace type second electronic device, a bracelet type second electronic device, a belt type second electronic device, a hat type second electronic device, an earring type second electronic device, a mask type second electronic device, a glasses type second electronic device, and a pauldron type second electronic device. In an embodiment, the first electronic device 100 may deliver device-related information relating to the second electronic devices to the service supporting device 300. In an embodiment, when establishing a communication channel between a watch type second electronic device and a necklace type second electronic device at a predetermined time, the first electronic device 100 may deliver device-related information corresponding to the watch type second electronic device and the necklace type second electronic device to the service supporting device 300. In an embodiment, the first electronic device 100 may output a list including items relating to the above-mentioned second electronic devices. Once an input signal for selecting a specific second electronic device (for example, a hat type second electronic device and a bracelet type second electronic device) occurs, the first electronic device 100 may transmit device-related information relating to items selected by the input signal to the service supporting device 300. In an embodiment, the first electronic device 100 may not deliver device-related information on the second electronic device, which can be identical to previous device-related information on the second electronic device, among second electronic devices connected to a communication channel to the service supporting device 300.

In operation 707, the service supporting device 300 may deliver function-related information corresponding to the device-related information to the first electronic device 100. In an embodiment, the service supporting device 300 may deliver function-related information corresponding to an integrated app that is simultaneously applied to the first electronic device 100 and the second electronic device 200, to the first electronic device 100. In an embodiment, the service supporting device 300 may deliver function-related information applicable to the first electronic device 100 or function-related information applicable to at least one of the second electronic devices 200 providing device-related information, to the first electronic device 100. Upon receipt of function-related information corresponding to an integrated app, the first electronic device 100 may store corresponding function-related information. Then, once connected to the second electronic device 200, the first electronic device 100 may extract information relating to the second electronic device 200 from function-related information corresponding to an integrated app and may then deliver the extracted information to the second electronic device 200. In an embodiment, the first electronic device 100 may transmit display item information for asking the second electronic device 200 whether to install an integrated app or selecting integrated app installation, to the second electronic device 200.

In operation 709, the first electronic device 100 may deliver function-related information to the second electronic device 200. In operation 711, the second electronic device 200 may control a process of data updating, a process of firmware the received function-related information. In an embodiment, In operation 711, the second electronic device 200 may control a process of a specific app newly installation or a specific app updating, or a firmware installation.

In an embodiment, the service supporting device 300 may transmit a function-related information list to the first electronic device 100 in operation 713. In operation 715, the first electronic device 100 may output a function-related information list. The first electronic device 100 may receive an input signal for selecting at least one item from the function-related information list. In operation 717, the first electronic device 100 may transmit a function-related information request for items selected by a corresponding input signal to the service supporting device 300. Upon receipt of the function-related information request from the first electronic device 100, the service supporting device 300 may transmit at least one function-related information corresponding to the function-related information request to the first electronic device 100.

In an embodiment, the service supporting device 300 may transmit a function-related information list to the first electronic device 100 in operation 719. In operation 721, the first electronic device 100 may deliver the received function-related information list to the second electronic device 200. In an embodiment, in operation 721, the first electronic device 100 may extract items relating to the second electronic device 200 from the received function-related information list and may deliver at least part of the function-related information list to corresponding electronic devices 200. In operation 723, the second electronic device 200 may output the function-related information list. When an item in the function-related information list is selected, the second electronic device 200 may transmit a function-related information request corresponding to the selected item to the first electronic device 100 in operation 725. The first electronic device 100 may transmit the function-related information request received from the second electronic device 200 to the service supporting device 300 in operation 727. Upon receipt of function-related information corresponding to the function-related information request from the service supporting device 300, the first electronic device 100 may deliver the function-related information to the corresponding second electronic device 200.

In an embodiment, the service supporting device 300 may store and manage identification information on the first electronic device 100 and device-related information on the second electronic device 200. When providing function-related information to the second electronic device 200, the service supporting device 300 may receive a function-related information processing result of the second electronic device 200 through the first electronic device 100. The service supporting device 300 may update the device-related information on the second electronic device 200 relating to the identification information on the first electronic device 100 on the basis of the received function-related information processing result. The service supporting device 300 may perform information management on a specific app newly installed state or a specific app update state, or a firmware installation state or update state of the second electronic device 200.

In an embodiment, the service supporting device 300 may create or store a new app or app update information, or new firmware or firmware update information. The service supporting device 300 may automatically select a second electronic device that receives newly created or stored information on the basis of the managed device-related information.

The service supporting device 300 may transmit new function-related information to the first electronic device 100 in operation 707 or may transmit a function-related information list to the first electronic device 100 in operation 713, on the basis of the identification information on the first electronic device 100 relating to the second electronic device 200.

Moreover, the identification information on the first electronic device 100 may include connection information and device-related information on the first electronic device 100. Once the identification information on the first electronic device 100 can be delivered to the service supporting device 300, the service supporting device 300 may provide function-related information to be applied to the first electronic device 100 to the first electronic device 100 on the basis of the identification information.

In terms of a configuration, the above-mentioned data processing method may include an operation of collecting, by the first electronic device 100, device-related information on at least one second electronic device 200 connectable through a short range communication channel in correspondence to an event occurrence and an operation of transmitting, by the first electronic device 100, the collected device-related information and its identification information to the service supporting device 300.

In an embodiment, the method may further include an operation of receiving, by the first electronic device 100, at least one of function-related information installable or updatable on the second electronic device 200 and a list of function-related information from the service supporting device 300.

In an embodiment, the receiving operation may further include at least one of an operation of receiving at least one of function-related information installable or updatable on the second electronic device 200 and a list of function-related information and an operation of receiving an integrated app or integrated app item including some routines installed on the second electronic device 200 and designed to perform a function through the first electronic device 100 and some routines to be applied to the first electronic device 100.

In an embodiment, the method may further include an operation of delivering, by the first electronic device, at least one of the function-related information and the function-related information list to the second electronic device 200.

In an embodiment, the method may further include an operation of outputting the function-related information list from the second electronic device 200, an operation of transmitting a selection event for selecting at least one item from the function-related information list from the second electronic device 200 to the first electronic device 100, an operation of transmitting, by the first electronic device 100, the selected event to the service supporting device 300, an operation of transmitting, by the service supporting device 300, function-related information corresponding to the selection event to the first electronic device 100, an operation of transmitting, by the first electronic device 100, function-related information corresponding to the selection event to the second electronic device 200, and an operation of processing, by the second electronic device 200, the function-related information.

In an embodiment, the method may further include an operation of delivering, by the second electronic device 200, the function-related information processing result to the first electronic device 100 or to the service supporting device 300 through the first electronic device 100.

In an embodiment, the transmitting operation may include at least one of an operation of transmitting device-related information on the at least one second electronic device 200 establishing the short range communication channel to the service supporting device 300, an operation of transmitting device-related information on a second electronic device 200 receiving a function management request among the second electronic devices 200 establishing the short range communication channel to the service supporting device 300, an operation of collecting pre-stored device-related information on at least one second electronic device 200 and transmitting the collected pre-stored device-related information to the service supporting device 300, and an operation of transmitting device-related information selected by a user input among the pre-stored device-related information on the second electronic device 200 to the service supporting device 300.

In an embodiment, the method may further include at least one of an operation of separately displaying, by the first electronic device 100, function-related information applicable to at least one of the first electronic device 100 and the second electronic device 200 and an operation of separately displaying, by at least one of the first electronic device 100 and the second electronic device 200, firmware update information and installable app information on the second electronic device 200.

Figure 8:
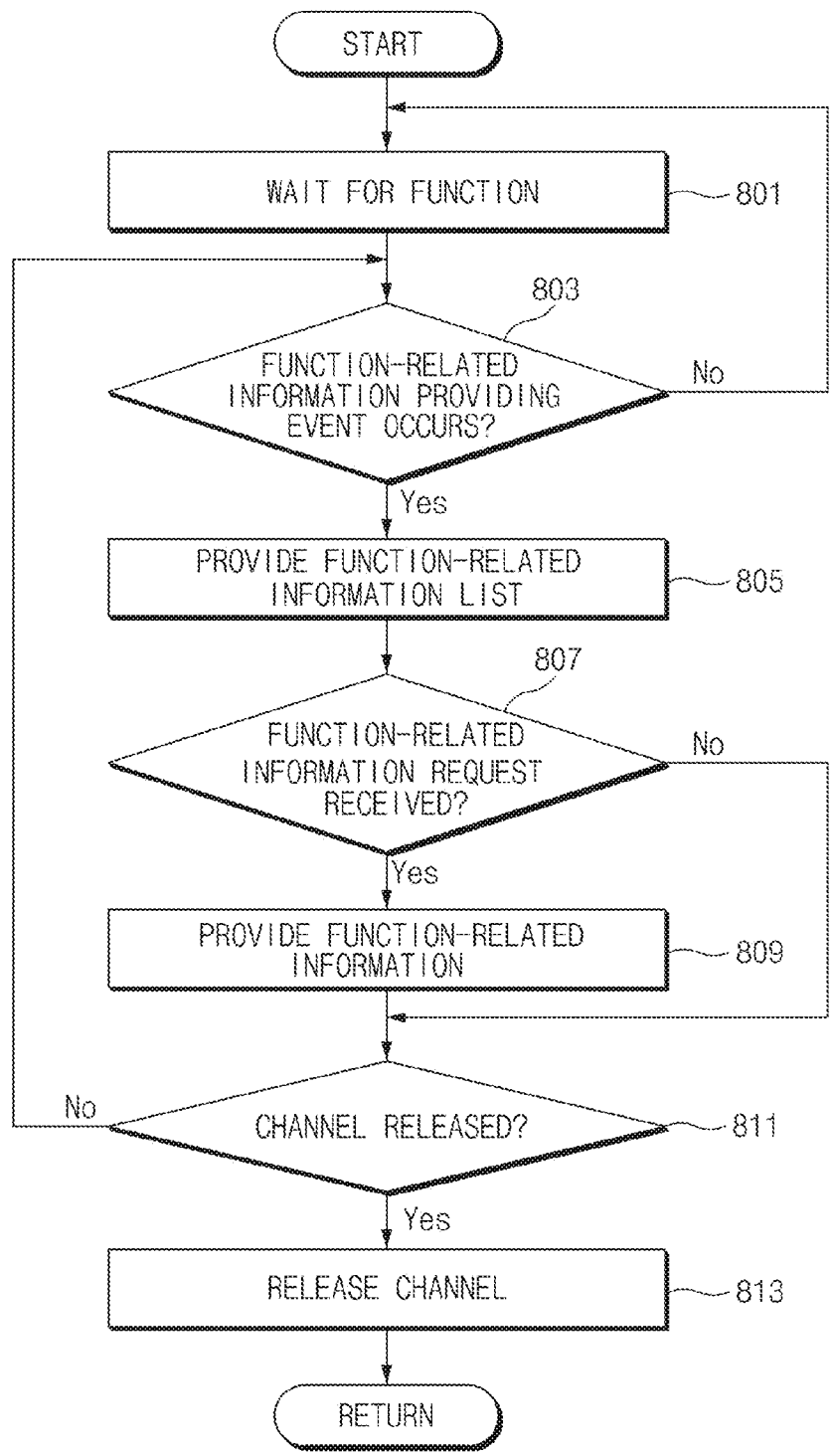
FIG. 8 is a flowchart relating to an example service supporting device management method according to this disclosure.

FIG. 8 is a flowchart relating to an example service supporting device management method according to this disclosure.

Referring to FIG. 8, in relation to the service supporting device management method, the service supporting device 300 may wait for a function in operation 801. The function waiting means that the service supporting device 300 may maintain a connection state of the communication network 400 by activating the service communication module 310. In operation 803, the service supporting device 300 may confirm whether an event relating to the provision of function-related information occurs. The event relating to the provision of function-related information may be an event relating to creating and receiving new app or firmware and app update information or firm update information and an access event of the first electronic device 100. If the event relating to the provision of function-related information occurs, the service supporting device 300 may confirm whether there are the first electronic device 100 and the second electronic device 200 requiring corresponding function-related information reception. If the event relating to the provision of function-related information does not occur in operation 803, the service supporting device 300 may control maintaining a function waiting state. If the event relating to the provision of function-related information occurs in operation 803, the service supporting device may provide a function-related information list corresponding to the function-related information to the first electronic device 100 in operation 805. In an embodiment, if there is function-related information to be provided to a specific second electronic device 200, the service supporting device 300 may confirm the identification information on the first electronic device 100 in addition to the device-related information on the second electronic device 200. The service supporting device 300 may provide a function-related information list to the first electronic device 100 on the basis of the identification information on the first electronic device 100. In an embodiment, if there is an integrated app applicable to the first electronic device 100 and the second electronic device 200, the service supporting device 300 may provide a function-related information list corresponding to a corresponding integrated app on the basis of the identification information on the first electronic device 100 and the device-related information on the second electronic device 200.

In operation 807, the service supporting device 300 may confirm whether a request relating to function-related information is received. In an embodiment, the service supporting device 300 may confirm whether a function-related information request corresponding to a specific item in the function-related information list is received from the first electronic device 100.

In operation 807, once the function-related information request is received, the service supporting device 300 may provide function-related information in operation 809. In an embodiment, if a specific app selection event applied to the second electronic device 200 is received, the service supporting device 300 may provide data corresponding to a corresponding app as function-related information to the first electronic device 100. For example, if information for selecting an integrated app that is simultaneously applied to the first electronic device 100 and the second electronic device 200, the service supporting device 300 may provide an integrated app to the first electronic device 100. If a request for firmware update information to be applied to the second electronic device 200 is received, the service supporting device 300 may deliver corresponding firmware update information to the first electronic device 100. According to various embodiments of the present invention, if there no specific function-related information request in operation 807, the service supporting device 300 may skip operation 809.

In operation 811, the service supporting device 300 may confirm whether there can be information corresponding to a channel release. The channel release may correspond to a connection release requested from the first electronic device 100. In an embodiment, if there is no information corresponding to a channel release, the service supporting device 300 may return to operation 803 and perform the subsequent operations. If a channel release event occurs in operation 811, the service supporting device 300 may perform a channel release in operation 813. The service supporting device 300 may return to operation 801 after the channel release and perform the subsequent operations. Moreover, as disclosed herein, when a specific item is selected from the function-related information list, function-related information corresponding to a corresponding item can be provided but embodiments of the present invention can be not limited thereto. For example, the service supporting device 300 may omit a function-related information list providing operation and may provide function-related information necessary for the first electronic device 100 and the second electronic device 200 to the first electronic device 100.

Figure 9:
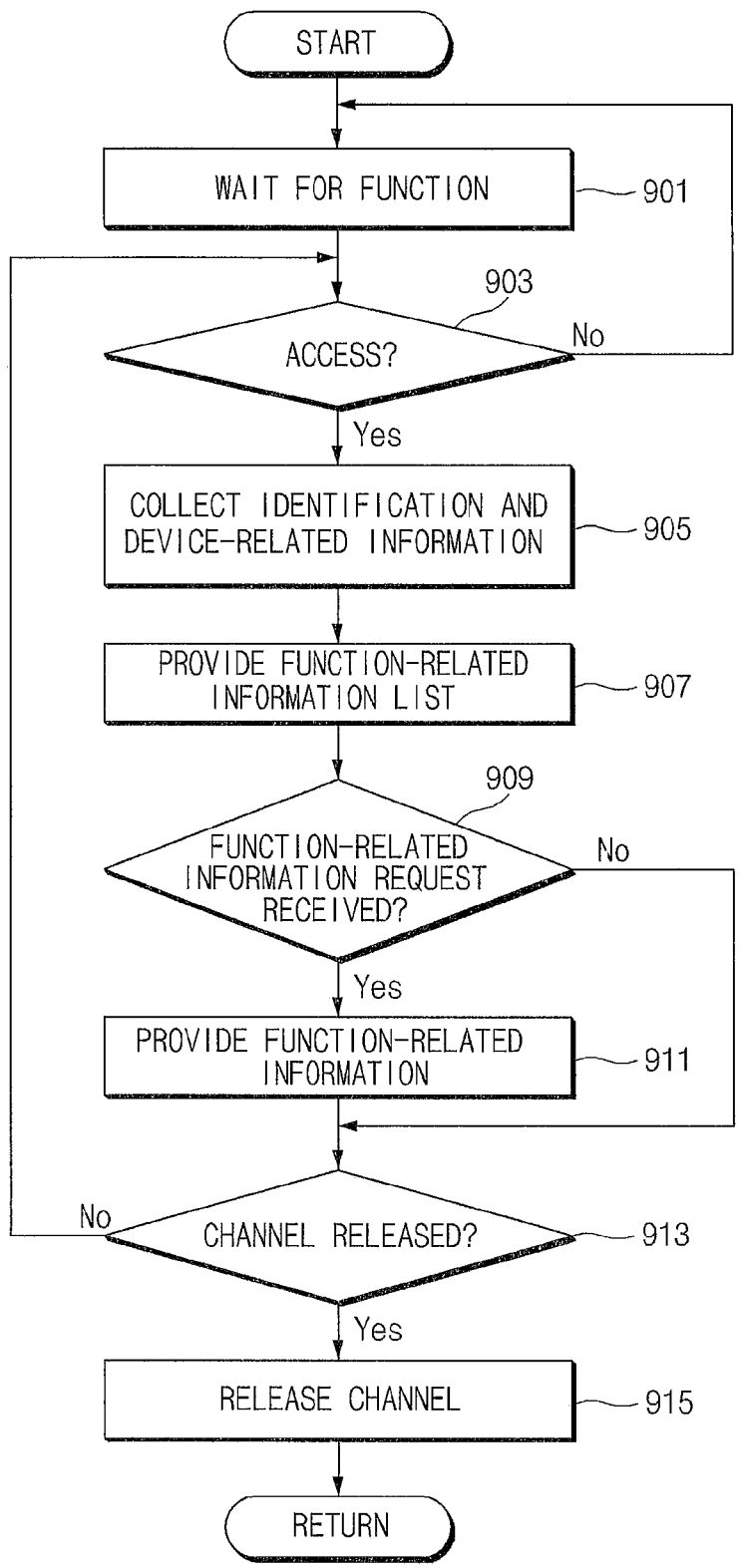
FIG. 9 is a flowchart relating to an example service supporting device management method according to this disclosure.

FIG. 9 is a flowchart relating to an example service supporting device management method according to this disclosure.

Referring to FIG. 9, in relation to the service supporting device management method, the service supporting device 300 may wait for a function in operation 901. In operation 903, the service supporting device 300 may confirm whether an access of the first electronic device 100 occurs in operation 903. If there is no access of the first electronic device 100, the service supporting device 300 may return to operation 901 and perform the subsequent operations again.

If there is an access of the first electronic device 100 in operation 903, the service supporting device 300 may collect identification information and device-related information in operation 905. The service supporting device 300 may perform an authentication operation during an access operation of the first electronic device 100. While the authentication operation can be performed, the service supporting device 300 may compare information that the first electronic device 100 provides and pre-registered ID and password information. The identification information may include information for identifying the first electronic device 100, information for establishing a communication channel with the first electronic device and state information on at least one of an app and firmware for confirming function-related information applicable to the first electronic device 100, and device characteristic information. The device-related information may include state information on at least one of an app and firmware for confirming function-related information applicable to the second electronic device 200 and device characteristic information. The device characteristic information may include hardware type information, operating system type information, and platform type information on a device. The service supporting device 300 may confirm the received identification information and device-related information and may search for applicable function-related information in correspondence to corresponding information.

Hereinafter, operation 907 to operation 915 may be similar to operation 805 to operation 813 described with reference to FIG. 8. For example, the service supporting device 300 may transmit a function-related information list to the first electronic device 100 in operation 907. In operation 909, the service supporting device 300 may confirm whether a specific function-related information request is received. In operation 901, the service supporting device 300 may provide the requested corresponding function-related information to the first electronic device 100. If there is no specific function-related information request in operation 909, the service supporting device 300 may skip operation 911. The service supporting device 300 may confirm whether a channel release request occurs in operation 913 and if there is the channel release request, the service supporting device 300 may perform a channel release in operation 915. If there is no channel release request in operation 913, the service supporting device 300 may proceed to operation 901 and perform the subsequent operations again. The service supporting device 300 may return to operation 901 after the channel release and perform the subsequent operations again.

Figure 10:
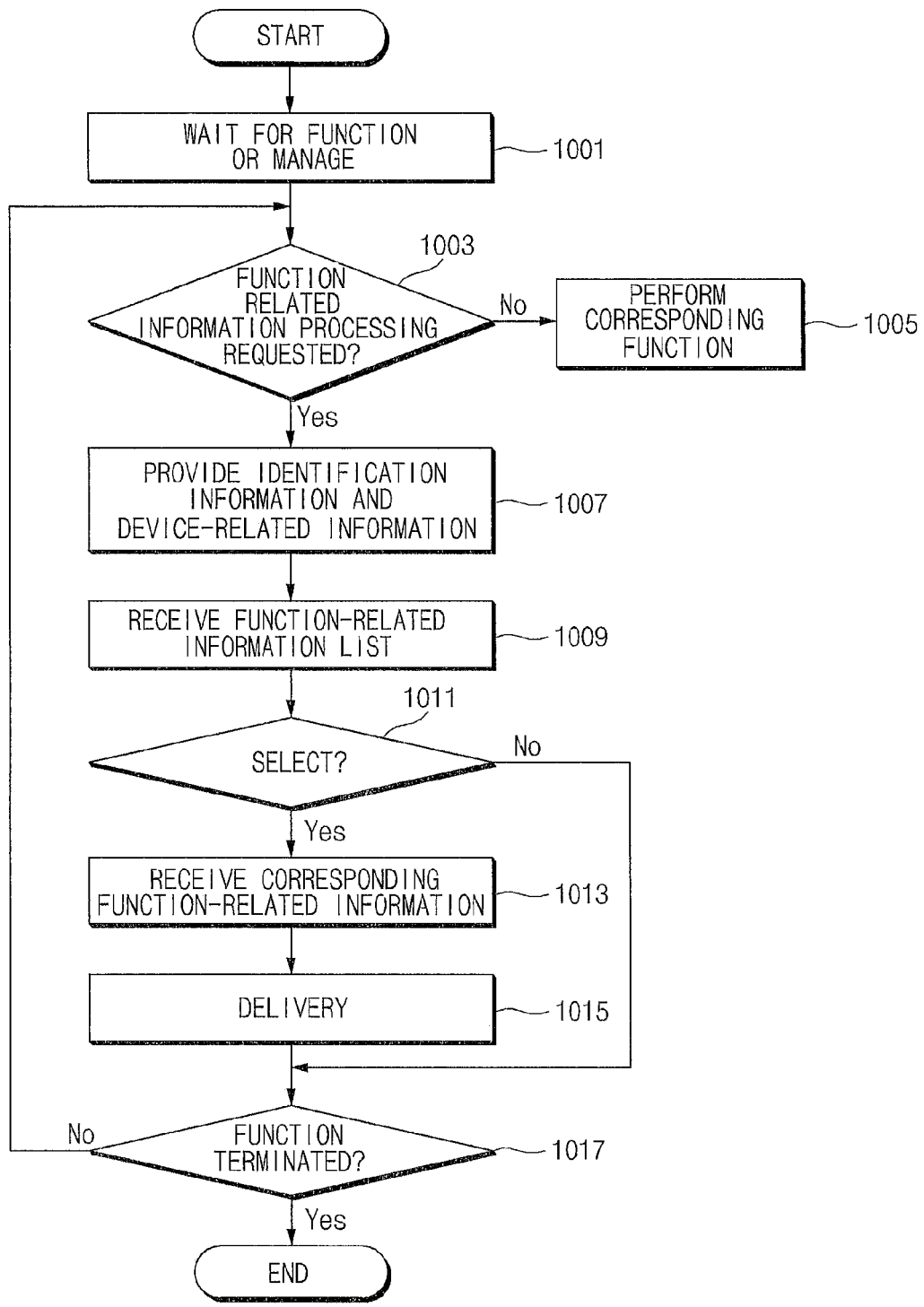
FIG. 10 is a flowchart relating to an example first electronic device management method according to this disclosure.

FIG. 10 is a flowchart relating to an example first electronic device management method according to this disclosure.

Referring to FIG. 10, in relation to the first electronic device management method, the first electronic device 100 may wait for a function or perform a function management in operation 1001. The first electronic device 100 may perform a specific function that the first electronic device 100 can be capable of supporting in correspondence to preset schedule information or a user input. In an embodiment, the first electronic device 100 may support at least one function performance among various functions such as a music playback function, a file editing function, a web access function, a broadcast receiving function, and a camera function. In an embodiment, the first electronic device 100 may maintain a sleep mode state.

In operation 1003, the first electronic device 100 may confirm whether a request relating to function-related information processing occurs. A request operation relating to function-related information processing may include at least one of an operation of establishing a short range communication channel with at least one second electronic device 200, an operation of receiving device-related information from the second electronic device 200, an operation of receiving a function management request from the second electronic device 200, an operation of confirming a user input or schedule information corresponding to an access request of the service supporting device 300, and an operation of establishing a communication channel with the service supporting device 300. If there is no related request in operation 1003, the first electronic device 100 may control a function performance corresponding to the occurred event in operation 1005.

If a request relating to function-related information processing occurs in operation 1003, the first electronic device 100 may provide identification information and device-related information to the service supporting device 300 in operation 1007. In operation 1009, the first electronic device 100 may receive a function-related information list from the service supporting device 300. The first electronic device 100 may output the function-related information list to the display module 140.

In operation 1011, the first electronic device 100 may confirm whether an event for selecting a specific item in the function-related information list can be received. In operation 1011, if the event for selecting a specific item occurs, the first electronic device 100 may transmit the selection event to the service supporting device 300. In operation 1013, the first electronic device 100 may receive function-related information corresponding to the selection event from the service supporting device 300.

In operation 1015, the first electronic device 100 may deliver the received function-related information to the second electronic device 200. Herein, if the function-related information is information necessary for the first electronic device 100, operation 1015 may be replaced with an operation of applying the received function-related information to the first electronic device 100. The first electronic device 100 may deliver function-related information by establishing a short range communication channel with the second electronic device 200 or may deliver function-related information through an already established short range communication channel.

In an embodiment, when an integrated app or integrated app update information is selected from the function-related information list, the first electronic device 100 may receive the integrated app or integrated app update information in operation 1013. The first electronic device 100 may extract some routines to be applied to itself from the integrated app or integrated app update information and may apply the extracted some routines. The first electronic device 100 may extract some routines to be applied to the second electronic device 200 from the integrated app or integrated app update information and may deliver the extracted some routines to the second electronic device 200.

In operation 1017, the first electronic device 100 may confirm whether an event relating to a function termination occurs. If there is no function termination event, the first electronic device 100 may proceed to operation 1003 and may perform the subsequent operations again.

In an embodiment, the first electronic device 100 may receive a function-related information list in a push type from the service supporting device 300. The first electronic device 100 may output the received function-related information list to the display module 140 as described in operation 1009 and may perform the subsequent operations as described above.

Figure 11:
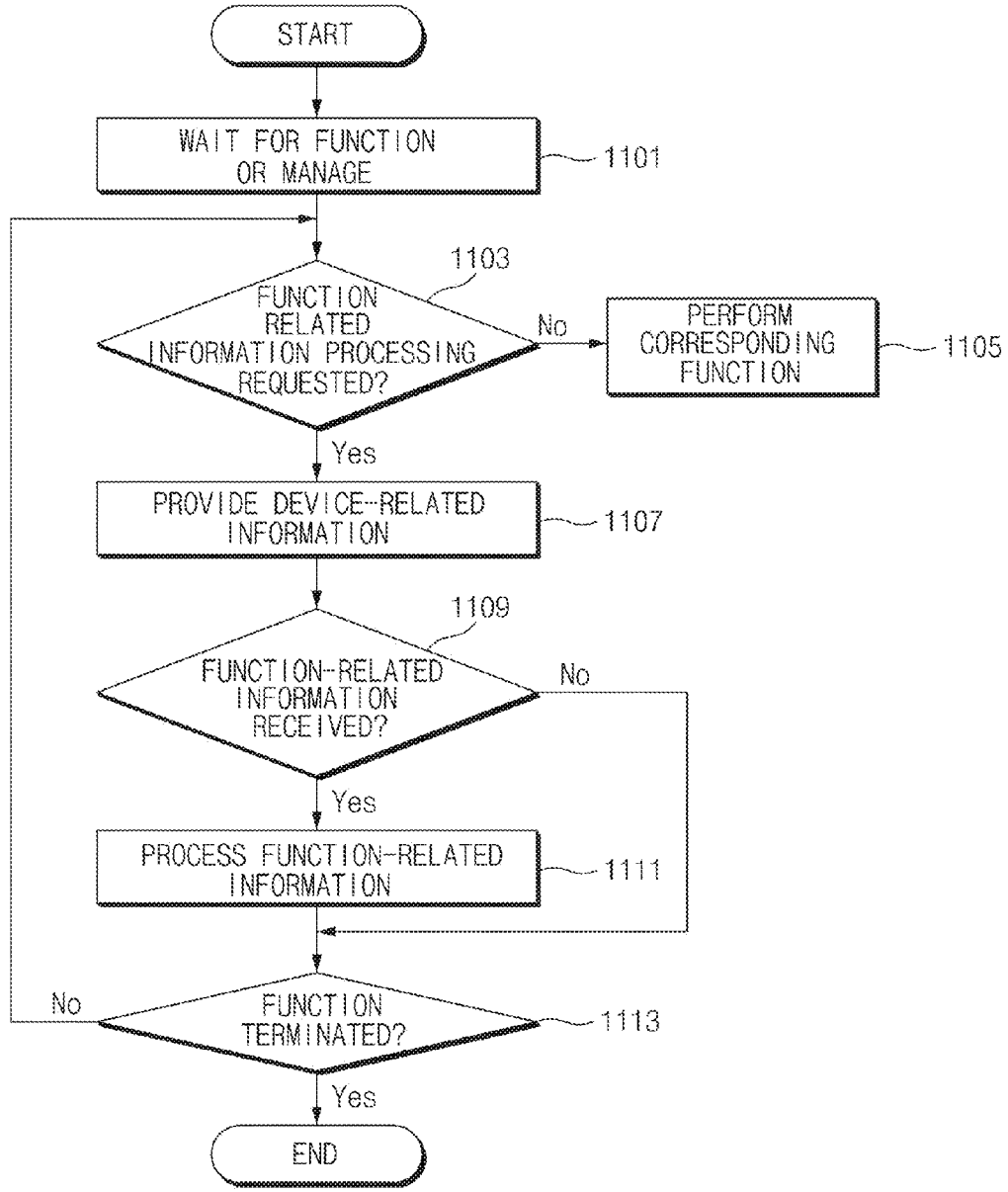
FIG. 11 is a flowchart relating to an example second electronic device management method according to this disclosure.

FIG. 11 is a flowchart relating to an example second electronic device management method according to this disclosure.

Referring to FIG. 11, in relation to the second electronic device management method, the second electronic device 200 may wait for a function in operation 1101. For example, the second electronic device 200 may maintain a sleep state. The second electronic device 200 may have a call reception waiting state. The second electronic device 200 may perform a time displaying function. The second electronic device 200 may have a waiting state relating to a short range communication channel establishment.

In operation 1103, the second electronic device 200 may confirm whether an event relating to function-related information processing occurs. In this operation, if there is no related event occurrence, the second electronic device 200 may proceed to operation 1105 and may support function performance corresponding to the occurred event. For example, the second electronic device 200 may maintain a previous state, adjust the volume in correspondence to a user input or perform function switching.

If the event relating to function-related information processing occurs in operation 1103, the second electronic device 200 may deliver device-related information to the first electronic device 100 in operation 1107. The event relating to function-related information processing in the second electronic device 200 may include at least one of an operation of generating a pre-defined user input or a pre-defined motion signal and an operation of receiving a request for short range communication channel establishment from the first electronic device 100. In operation 1107, the second electronic device 200 may establish a short range communication channel with the first electronic device 100 in relation to device-related information delivery.

In operation 1109, the second electronic device 200 may confirm whether there is function-related information reception. If there can be function-related information reception, the second electronic device 200 may perform function-related information processing in operation 1111. For example, the function-related information processing operation may include an operation of installing a new app and an operation of performing app or firmware update. In operation 1113, the second electronic device 200 may confirm whether an event relating to a function termination occurs. If there is no function termination event, the second electronic device 200 may proceed to operation 1103 and may perform the subsequent operations again.

In an embodiment, the second electronic device 200 may receive a function-related information list in operation 1109. The second electronic device 200 may output the received function-related information list through the device output module 240. When an event for selecting specific item in the function-related information list occurs, the second electronic device 200 may provide a corresponding selection even to the first electronic device 100. The second electronic device 200 may receive function-related information corresponding to the selection event through the first electronic device 100.

In an embodiment, the second electronic device 200 may provide device-related information to the first electronic device 100 in advance. The second electronic device 200 may receive device-related information from the first electronic device 200 and may process the received information by default. In an embodiment, the second electronic device 200 may receive a device-related information list from the first electronic device 200 and may process the received function-related information in correspondence to the selection event.

Figure 12:
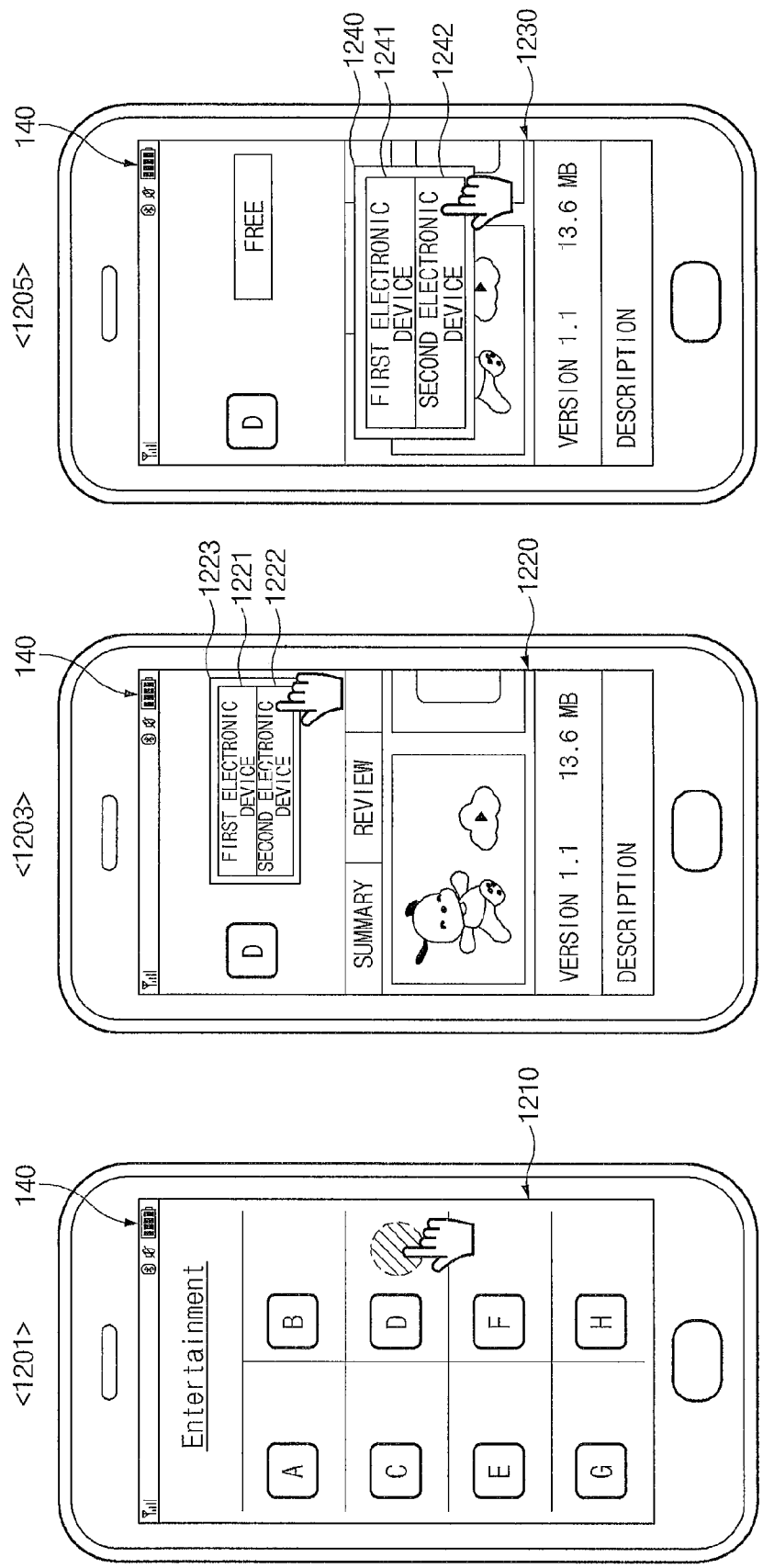
FIG. 12 is a view relating to an example screen interface of a first electronic device according to this disclosure.

FIG. 12 is a view relating to an example screen interface of a first electronic device according to this disclosure.

Referring to FIG. 12, when the first electronic device 100 accesses the service supporting device 300, the first electronic device 100 may receive a service page that the service supporting device 300 provides. In an embodiment, the display module 140 may output a function-related information list basic screen 1210 as shown in a screen 1201. The function-related information list basic screen 1210 may be a list screen including function-related information possessed by the service supporting device 300. In an embodiment, the function-related information list basic screen 1210 may be a list screen including function-related information applicable to at least one of the first electronic device 100 and the second electronic device 200.

If a specific item is selected from the function-related information list basic screen 1210, the display module 140 may output a detail screen 1220 relating to the selected item as shown in a screen 1203. The detail screen 1220 may be a screen displaying detail information on the selected function-related information item. The selected function-related information item may include an information item 1223 supporting each of the first electronic device 100 and the second electronic device 200. In this case, as shown in the drawing, the information item 1223 in the detail screen 1220 may include a virtual key button for requesting function-related information applied to the first electronic device 100 and a virtual key button 1222 for requesting function-related information applied to the second electronic device 200. When the virtual key button 1221 is selected, the first electronic device 100 may request function-related information to be applied to the first electronic device 100 from the service supporting device 300. When the virtual key button 1222 is selected, the first electronic device 100 may request function-related information to be applied to the second electronic device 200 from the service supporting device 300.

In an embodiment, the information item 1223 in the detail screen 1220 may indicate that corresponding function-related information may be applied to each of the first electronic device 100 and the second electronic device 200. When the information item 1223 is selected, the display module 140 may output an additional selection window 1240 on the function-related information selection screen 1230 as shown in a screen 1205. The selection window 1240 may be used to designate an installation path of function-related information. For example, the selection window 1240 may include an item 1241 for requesting installation on the first electronic device 100 and an item 1242 for requesting installation on the second electronic device 200. Here, the item 1241 may correspond to the above-mentioned virtual key button 1221 and the item 1242 may correspond to the above-mentioned virtual key button 1222. When the item 1241 is selected, function-related information applied to the first electronic device 100 may be requested from the service supporting device 300. When the item 1242 is selected, function-related information applied to the second electronic device 200 may be requested from the service supporting device 300.

In an embodiment, the information item 1223 may be a display item corresponding to an integrated app. When the information item 1223 corresponding to an integrated app is selected, the first electronic device 100 may request an integrated app or integrated app update information from the service supporting device 300. The first electronic device 100 may receive an integrated app or integrated app update information to be applied to the first electronic device 100 and the second electronic device 200.

Figure 13:
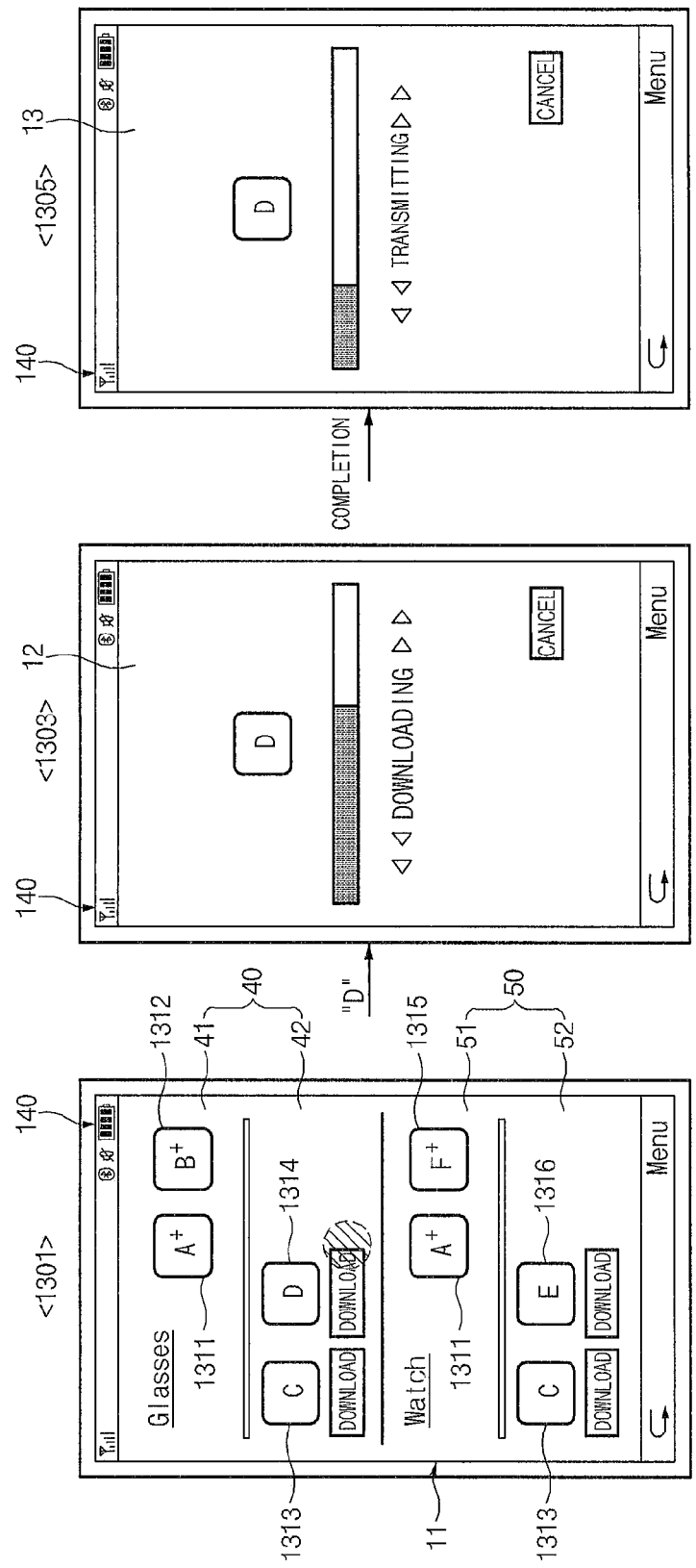
FIG. 13 is a view relating to an example screen interface of a first electronic device according to this disclosure.

FIG. 13 is a view relating to an example screen interface of a first electronic device according to this disclosure.

The first electronic device 100 may transmit identification information in addition to device-related information on the second electronic device 200 to the service supporting device 300. The service supporting device 300 may provide a function-related information list relating to device-related information on the second electronic device 200 to the first electronic device 100. In an embodiment, the first electronic device 100 may receive device-related information on a glasses type electronic device and a watch type electronic device and may then transmit the received device-related information to the service supporting device 300. In an embodiment, the first electronic device 100 may maintain a short range communication connection with the glasses type electronic device and the watch type electronic device and may transmit device-related information on corresponding devices to the service supporting device 300. In an embodiment, the first electronic device 100 may transmit device-related information on the glasses type electronic device and the watch type electronic device, selected by a user input, to the service supporting device 300. In an embodiment, the first electronic device 100 may deliver more various second electronic devices to the service supporting device 300. A screen displaying the items shown in the drawing may be a screen displaying only some items in a function-related information list classification screen of various second electronic devices.

Referring to FIG. 13, the display module 140 of the first electronic device 100 may output a function-related information list classification screen 11 applicable to the second electronic device 200 as shown in a screen 1301. The function-related information list classification screen 11 may include a glasses device list area 40 relating a glasses type electronic device and a watch device list area 50 relating to a watch type electronic device.

The glasses device list area 40 may include a glasses update information area 41 and a glasses app information area 42. The glasses update information area 41 may include glasses device update information items 1311 and 1312 corresponding to app update information on an app installed on a glasses type electronic device or firmware update information. The glasses app information area 42 may be used for arranging glasses device app items 1313 and 1314 installable on the glasses type electronic device. The glasses app information area 42 may be used for arranging firmware items installable on the glasses type electronic device.

The watch device list area 50 may include a watch update information area 51 and a watch app information area 52. The watch update information area 51 may include watch device update information items 1311 and 1315 corresponding to app update information on an app installed on a watch type electronic device or firmware update information. The watch app information area 52 may be used for arranging watch device app items 1313 and 1316 installable on the watch type electronic device. The watch app information area 52 may be used for arranging firmware items installable on the watch type electronic device.

In an embodiment, the same app or firmware, for example, a first function app may be installed on a glasses type electronic device and a watch type electronic device. An update information item 1223 of the first function app may be disposed in each of the glasses update information area 41 and the watch update information area 51.

In an embodiment, the same app installation can be possible in a glasses type electronic device and a watch type electronic device. For example, a second function app may be installable. Correspondingly, an app item 131 may be disposed in the glasses app information area 42 and the watch app information area 52.

In an embodiment, a unique installable app may be possible in each of a glasses type electronic device and a watch type electronic device. Referring to the drawing, the function app item 1314 may be a function app installable on a glasses type electronic device. The function app item 1316 may be a function app installable on a watch type electronic device.

In an embodiment, a unique installable app may be already installed in each of a glasses type electronic device and a watch type electronic device. Correspondingly, the function app item 1312 may be an update information item of an app installed on a glasses type electronic device. The function app item 1316 may be an update information item of an app installed on a watch type electronic device.

If the function app item 1314 can be selected from the function-related information list classification screen 11, the first electronic device 100 may deliver a corresponding function-related information request to the service supporting device 300. The display module 140 of the first electronic device 100 may output a data reception screen 12 for receiving function app data corresponding to the function app item 1314 as shown in screen 1303. Once the data reception of the function app 1314 can be completed, the display module 140 of the first electronic device 100 may output a data delivery screen 13 for delivering data of the function app 1314 to the second electronic device 200 as shown in screen 1305.

In an embodiment, upon receipt of the data of the function app 1314, the first electronic device 100 may forward the received data to the second electronic device 200, for example, a glasses type electronic device. In an embodiment, the first electronic device 100 may confirm a connection state with a glasses type electronic device and if a short range communication connection can be released, may receive and store the function app 1314. The first electronic device 100 may attempt a short range communication connection with a glasses type electronic device periodically or in correspondence to a user input and may deliver a function app, which can be stored when the short range communication connection is successful, to a glasses type electronic device.

Figure 14:
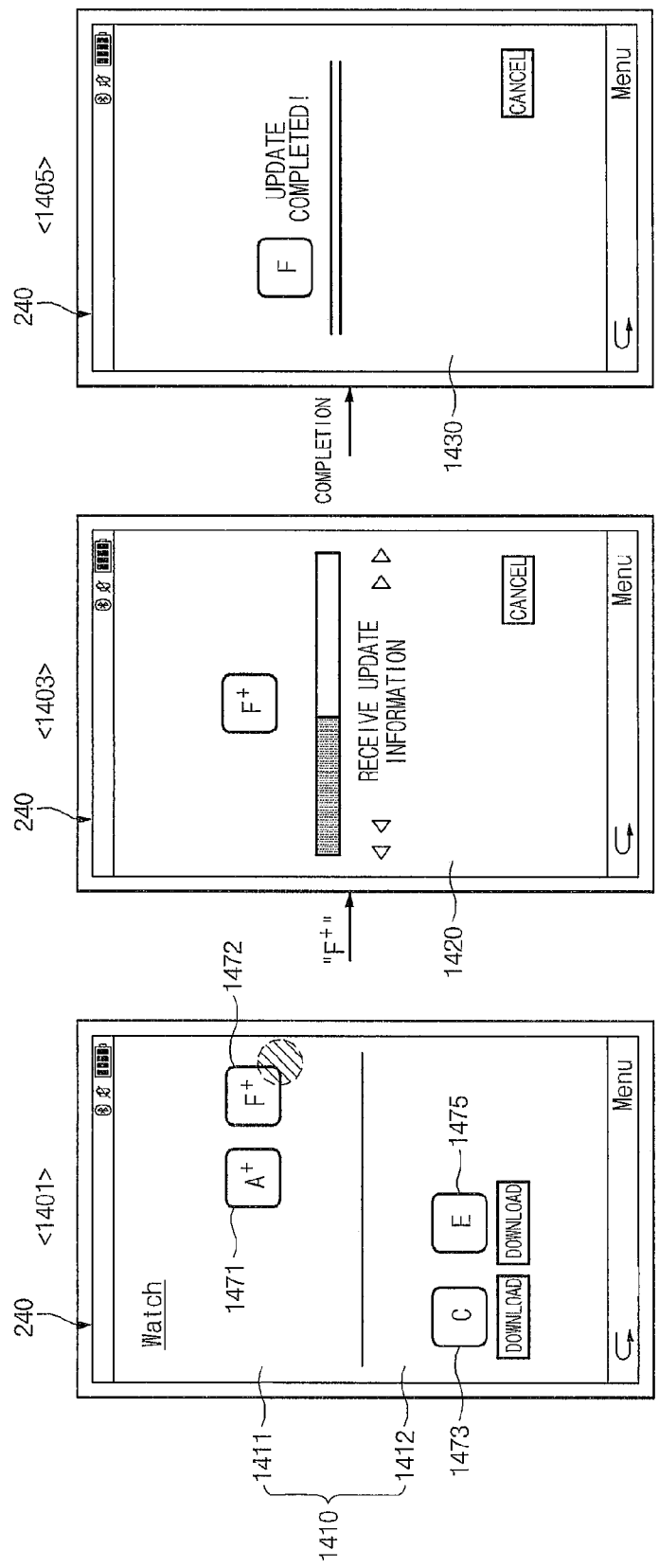
FIG. 14 is a view relating to an example screen interface of a second electronic device according to this disclosure.

FIG. 14 is a view relating to an example screen interface of a second electronic device according to this disclosure. The second electronic device 200 may establish a short range communication channel with the first electronic device 100 and may receive a function-related information list from the first electronic device 100. The second electronic device 200 may be a watch type electronic device.

Referring to FIG. 14, the device output module 240 of the second electronic device 200 may output a glasses function-related information list screen 1410 as shown in a screen 1401. The glasses function-related information list screen 1410 may include an update information area 1411 and an app item area 1412. Update information items 1471 and 1472 of apps installed on a glasses type electronic device may be disposed in the update information area 1411. App items 1473 and 1475 installable on a glasses type electronic device may be disposed in an app item area 1412.

Here, when the update information item 1472 is selected, the second electronic device 200 may request update information corresponding to the update information item 1472 from the first electronic device 100. Upon receipt of update information from the first electronic device 100, the second electronic device 100 may output a data reception state screen 1420 as shown in a screen 1403. Once the processing of the received update information is completed, the second electronic device 100 may output a data processing screen 1430 as shown in a screen 1405. Here, the second electronic device 200 may perform corresponding information processing in addition to the update information reception. In an embodiment, after update information reception completion, the second electronic device 200 may perform corresponding information processing.

Figure 15:
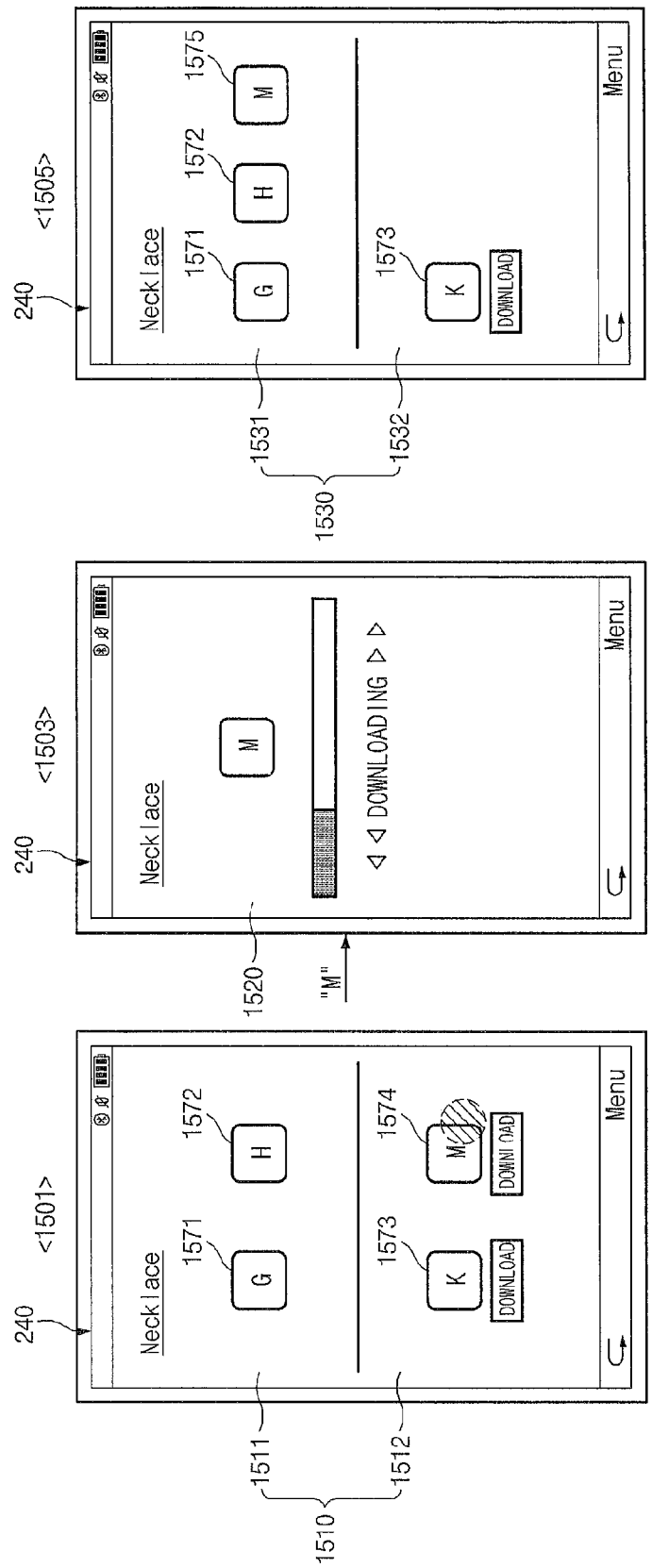
FIG. 15 is a view relating to an example screen interface of a second electronic device according to this disclosure.

FIG. 15 is a view relating to an example screen interface of a second electronic device according to this disclosure. For example, a necklace type electronic device can be exemplified as the second electronic device 200. The device output module 240 of the second electronic device 200 may receive function-related information received from the first electronic device 200. The second electronic device 100 may extract function-related information items corresponding to a necklace type electronic device. In an embodiment, the first electronic device 100 may transmit function-related information items corresponding to a necklace type electronic device.

Referring to FIG. 15, the device output module 240 may output a function-related information screen 1510 as shown in a screen 1501. The function-related information screen 1510 may include a function screen area 1511 and a reception information list area 1512. The function screen area 1511 may output function items 1571 and 1572 installed on a necklace type electronic device. The function item 1571 may be a time display app item installed on a necklace type electronic device. The function item 1572 may be a flash function app item installed on a necklace type electronic device. The reception information list area 1512 may output items 1573 and 1574 installable on the second electronic device 200. For example, the installable item 1573 may be an alarm function app. For example, the installable item 1574 may be a camera function app.

When a selection event for selecting the installable item 1574 occurs, the second electronic device 200 may deliver a corresponding selection event to the first electronic device 100. The first electronic device 100 may deliver camera function app data corresponding to an installable item to the second electronic device 200 in correspondence to a request of the second electronic device 200. The device output module 240 may output a screen 1520 while camera function app data is received as shown in a screen 1503. Once camera function app data reception is completed, the second electronic device 200 may install a camera function app.

Once a new app is installed, the device output module 240 may output an updated function-related information screen 1530 as shown in a screen 1505. The updated function-related information screen 1530 may include a function screen area 1531 and a reception information list area 1532. The function screen area 1531 may be used for arranging installable function items 1571, 1572, and 1575 in correspondence to a new camera function app installation. The reception information list area 1532 may be used for arranging an installable function item 1573 in correspondence to a function item installation.

In an embodiment, the second electronic device 200 may perform function-related information sharing with another electronic device. For example, the second electronic device 200 may establish a short range communication channel with another second electronic device in correspondence to a user input or a pre-defined motion signal occurrence. The second electronic device 200 may share device-related information through a shot range communication channel with another electronic device. The second electronic device 200 may confirm app or firmware state information in the received device-related information and based on this, as shown in FIGS. 14 and 15, may provide a screen interface. For example, the second electronic device 240 may output app update information items and app items to be received from another second electronic device to the device output module 240.

Figure 16:
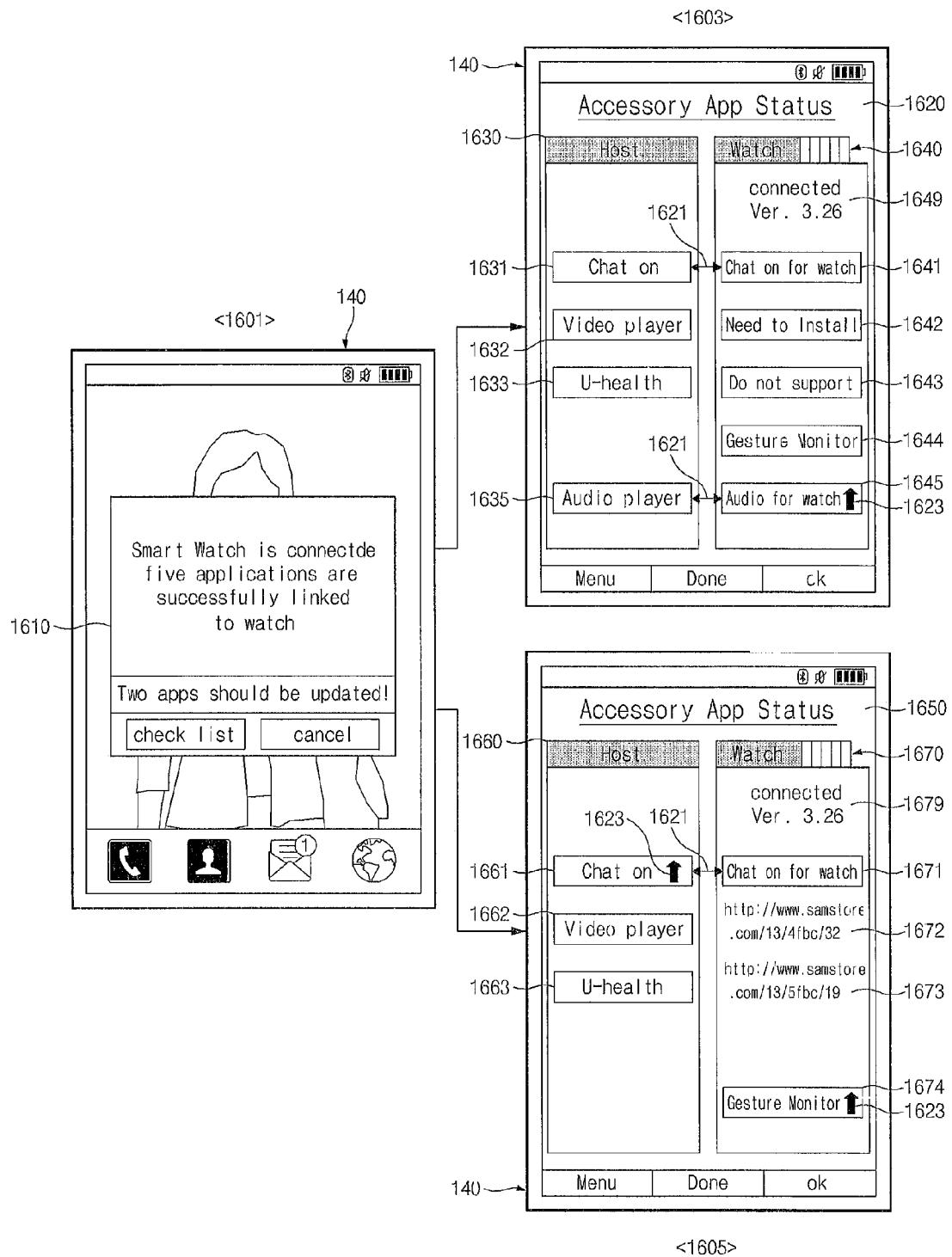
FIG. 16 is a view relating to an example screen interface of a first electronic device relating to an application state of a subordinate electronic device according to this disclosure.

FIG. 16 is a view illustrating an example screen interface of a first electronic device relating to an app state of a second electronic device according to this disclosure.

Referring to FIG. 16, once a communication channel (for example, a short range communication channel) is established with the second electronic device 200 (for example, a watch type second electronic device), the first electronic device 100 may output a pop-up window 1610 or a pop-up message to the display module 140 as show in a screen 1601. The first electronic device 200 may receive function-related information on the second electronic device 200 through the communication channel established with the second electronic device 200. The first electronic device 100 may confirm app installation state information on the second electronic device 200 included in the device-related information and may confirm which app is installed, there is an app to be updated in installed apps, or there is an installable app. Additionally, the first electronic device 100 may confirm firmware information on the second electronic device 200 included in the device-related information and may confirm whether firmware update is required. The first electronic device 100 may output a result corresponding to the confirmation task performance through a pop-up window 1610 as shown in the drawing. The pop-up window 1610 may include a confirmation virtual button and a cancel virtual button for confirmation cancel.

Once the confirmation virtual button is selected, the first electronic device 100 may output an app state information screen 1620 as shown in a screen 1603 or an app state information screen 1650 as shown in a screen 1605. The app state information screen 1620 may include a main device area 1630 and a sub device area 1640. For example, app items 1631, 1632, 1633, and 1635 installed on the first electronic device 100 may be disposed in the main device area 1630. For example, the sub device area 1640 may include app items 1641, 1644, and 1645 installed on the second electronic device 200. Additionally, the sub device area 1640 may include installation related information on the second electronic device 200 corresponding to app items installed on the first electronic device 100, for example, an app item 1642 notifying that the installation of the app item 1632 is necessary and an app item 1643 notifying that the installation of the app item 1633 is impossible. The app item 1631 may be a chatting app item. The app item 1631 may be an integrated app linked with a chatting function app item 1641 installed on the second electronic device 200. In an embodiment, the app item 1635 may be an integrated app linked with an audio function app item 1645 installed on the second electronic device 200. The display module 140 may output an integrated app indicator 1621 to identifying an integrated app linked between the first electronic device 100 and the second electronic device 200. The sub device area 1640 may output a firmware indicator 1649 including information relating to firmware installed on the second electronic device 200. The display module 140 may output an update indicator 1623 for indicating an update required item among specific app items.

The app state information screen 1650 may include a main device area 1660 and a sub device area 1670. For example, app items 1661, 1662, and 1663 installed on the first electronic device 100 may be disposed in the main device area 1660. For example, the sub device area 1670 may include app items 1671 and 1674 installed on the second electronic device 200. Additionally, the sub device area 1670 may output address information 1672 and 1673 relating to an app installable on the second electronic device 200. Once the address information 1672 or 1673 is selected, the first electronic device 100 may receive function-related information corresponding to corresponding address information from the service supporting device 300 by managing the communication module 110. Then, the first electronic device 100 may deliver the received function-related information to the second electronic device 200. Moreover, the sub device area 1670 may include a firmware indicator 1679. Additionally, the display module 140 may output an integrated app indicator 161 and an update indicator 1623.

Moreover, although the above-mentioned app state information screens can be outputted in correspondence to a confirmation virtual button selection, the present invention is not limited thereto. For example, after a communication channel is established between the second electronic device 200 and the first electronic device 100 and a predetermined time elapses, an app state information screen may be automatically outputted to the display module 140. In an embodiment, according to an icon, menu item, or hot key selection relating to an app state information screen output, the first electronic device 100 may output an app state information screen to the display module 140.

Figure 17:
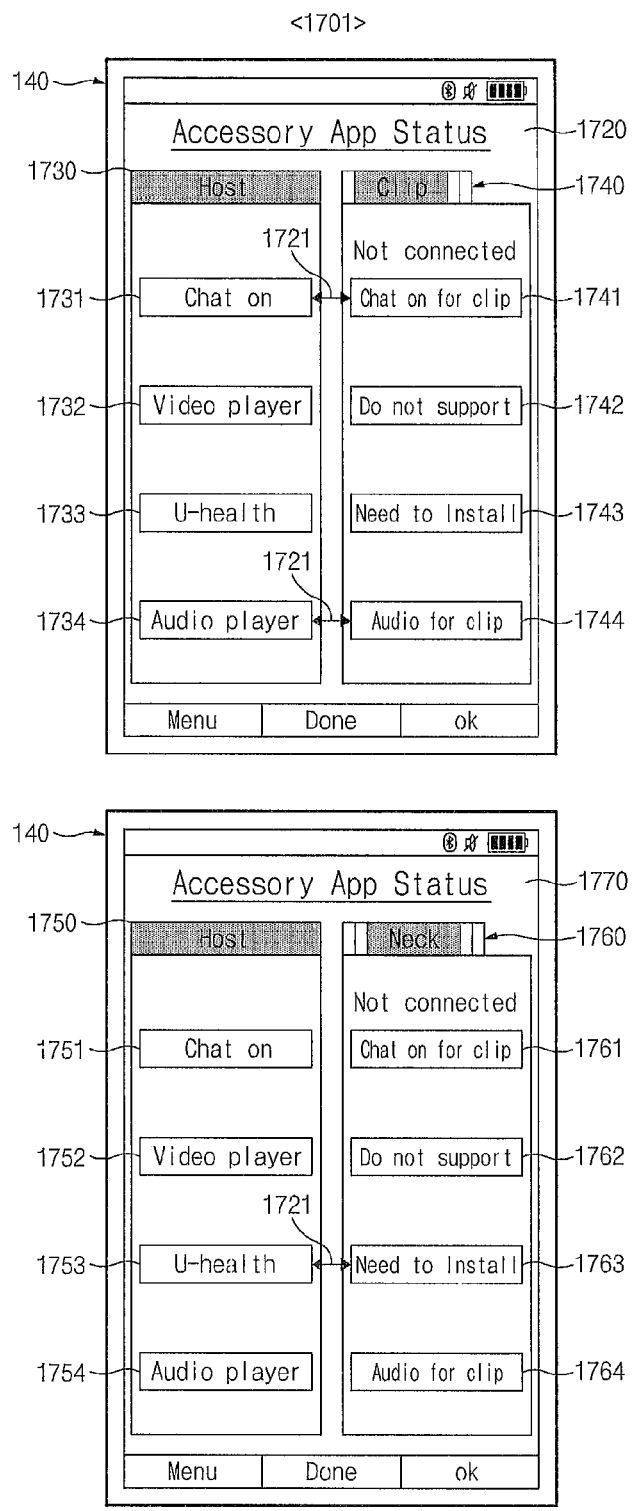
FIG. 17 is a view relating to an example screen interface of a first electronic device relating to an application state of a subordinate electronic device according to this disclosure.

FIG. 17 is a view illustrating an example screen interface of a first electronic device relating to an app state of a second electronic device according to this disclosure.

Referring to FIG. 17, while there is no connection with the second electronic device 200, the first electronic device 100 may output an app state information screen 1720 as shown in a screen 1701 or an app state information screen 1770 as shown in a screen 1703. The first electronic device 100 may output an icon or menu item to the display module 140 in relation to an output of an app state information screen 1720 or 1770. In an embodiment, the first electronic device 100 may allocate a specific button key or a virtual key as a key for app state information screen call.

An app state information screen 1720 of a screen 1701 may output a main device area 1730 and a sub device area 1740. The main device area 1730 may include app items 1731, 1732, 1733, and 1734. App items may correspond to apps installed on the first electronic device 100, respectively. The sub device area 1740 may output app items 1741, 1742, 1743, and 1744. The display module 140 may output an integrated app indicator 1721 so as to distinguish the integrated app items 1731, 1741, 1734, and 1744 from other app items. The first electronic device 100 may output a sub device area 1740 on the basis of device-related information previously stored through a history with the second electronic device 200. At this point, the first electronic device 100 may have a connection history with a plurality of second electronic devices. Then, the sub device area 1740 may confirm a tap area so as to confirm a connection history with each sub device. The current sub device area 1740 may include app items of a clip second electronic device having a connection history with the first electronic device 100.

Moreover, if another tap among taps of the sub device area 1740, for example, an input event for necklace second electronic device search, occurs, the first electronic device 100 may output an app state information screen 1770 as shown in a screen 1703. The app state information screen 1770 may include a main device area 1750 and a sub device area 1760. The main device area 1750 may output app items 1751, 1752, 1753, and 1754 relating to apps installed on the first electronic device 100. The sub device area 1760 may output app items 1763 relating to the second electronic device 200. Additionally, the sub device area 1760 may include information relating to app items arranged in the main device area 1750, for example, items 1761 and 1762 indicating apps not supported by the second electronic device 200 and an item 1764 indicating an installed app. The display module 140 may output an integrated app indicator 1721 indicating an integrated app.

As disclosed herein, the first electronic device 100 may output information on app items installed on the first electronic device 100 and app items installed on the second electronic device 200 or uninstalled app guide information or un-installable app guide information corresponding thereto. When connected to the second electronic device 200, the first electronic device 100 may support confirming app state information on a corresponding second electronic device 200. Additionally, when not connected to the second electronic device 200, the first electronic device 100 may support confirming app state information on the second electronic devices 200 having a connection history with the first electronic device 100. Additionally, even if connected to a specific second electronic device, for example, a watch type second electronic device, the first electronic device 100 may support app state information confirmation of another second electronic device having a previous connection history in correspondence to an input signal occurrence.

As disclosed herein, in an embodiment, the function management of the second electronic device 200 that cannot access or has difficulty in accessing the service supporting device 300 may be performed on the basis of the first electronic device 100. In this operation, since the app or firmware management of one or a plurality of second electronic devices 200 is performed, the first electronic device 100 may integrally perform the function management of the second electronic device 200.

Additionally, in an embodiment, a control module of at least one of the first electronic device 100, the second electronic device 200, and the service supporting device 300 may include a bus and at least one processor. Here, the processor may include at least one of the device information processing module 161, the function information processing module 163, and the information output processing module 165. In an embodiment, the device information processing module 161, the function information processing module 163, and the information output processing module 165 may include at least one processor.

The bus may be a circuit that connects components (for example, a processor, a storage module, an input module, a display module, an output module, or a communication module) to each other in electronic devices and delivers communication (for example, a control message) between the components.

The processor may receive an instruction from components included in electronic device through a bus, interpret the received instruction, and perform operations or data processing according to the interpreted instruction. At this point, the processor may control providing service on the basis of a corresponding application by executing at least one application stored in the storage module 150 or the device storage module 250.

In an embodiment, the processor may include at least one application processor (AP) or at least one communication processor (CP). Here, the AP or CP may be included in a processor or different IC packages, respectively. Additionally, the AP or CP may be included in one IC package. The AP may control a plurality of hardware or software components connected to the AP and performing various data processing and operations including multimedia data by executing an operating system or application program. Here, the AP may be implemented with a system on chip (SoC). Additionally, the CP may perform at least part of a control function. Additionally, the CP may perform the distinction and authentication of a terminal in a communication network by using a subscriber identification module (for example, a SIM card). At this point, the CP may provide service including a voice call, a video call, a text message, or packet data to a user. Additionally, the CP may control the data transmission of the communication module 260. The AP or CP may load an instruction or data received from at least one of nonvolatile memory or another component connected thereto into volatile memory and may then process the loaded data. Moreover, the AP or CP may store data received from at least one of other components or data generated by at least one of other components in nonvolatile memory. The CP may perform a function of managing a data link and converting a communication program in communication between other electronic devices connected to an electronic device including hardware through a network. Here, the CP may be implemented with a SoC. Additionally, the processor may further include a graphic processing unit (GPU).

On the other hand, although modifications vary in accordance with the convergence trend of digital devices and thus cannot be all listed, at least one of a first electronic device or a second electronic device may further include components not mentioned above, for example, an acceleration sensor, a gyro sensor, a GPS module, a Near Filed Communication (NFC) module, a vibration motor, and accessories. Furthermore, the first electronic device or the second electronic device may exclude specific components from the above components or replace them with other components according to a form provided.

As disclosed herein, in an embodiment, a data processing method and an electronic device supporting the same may perform installation and updating of information relating to a function of an electronic device through a specific electronic device or a service supporting device, thereby supporting an integrated and simplified operation.

Moreover, in an embodiment, a data processing method and an electronic device supporting the same may allow an electronic device, which cannot connect to or has difficulties in connecting to a service supporting device, to perform a control to manage (for example, execute or update) an application through an external electronic device.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

Although the present disclosure has been described with an exemplary embodiment, various changes and modifications may be suggested to one skilled in the art. It can be intended that the present disclosure encompass such changes and modifications as fall within the scope of the appended claims.

What is claimed is:

1. An electronic device comprising:
a short range communication module configured to establish a communication channel for collecting device-related information on another electronic device;
a communication module configured to establish a communication channel with a service supporting device; and
a control module configured to transmit a message requesting function-related information installable or updatable on the other electronic device to the service supporting device in correspondence with the device-related information and configured to control transmitting identification information for receiving the function-related information and the device-related information, wherein the function-related information is installable application information or updatable application information for the other electronic device, and wherein the control module controls to transmit directly at least part of the function-related information to the other electronic device corresponding to the device-related information.

2. The electronic device according to claim 1, wherein the control module is configured to control the transmission of the device-related information on the other electronic device, establishing the communication channel through the short range communication module to the service supporting device, or configured to control the transmission of the device-related information on the other electronic device receiving a request for function management among other electronic devices establishing the communication channel through the short range communication module to the service supporting device.

3. The electronic device according to claim 1, further comprising a storage module configured to store the collected device-related information,
wherein the control module is configured to transmit the device-related information stored in the storage module to the service supporting device or transmit device-related information selected by a user input among the stored device-related information to the service supporting device.

4. The electronic device according to claim 1, wherein the control module is configured to control delivery of at least one function-related information installable or updatable on the other electronic device received from the service supporting device and a function-related information list configured with display items of the function-related information to the other electronic device.

5. The electronic device according to claim 4, further comprising a display module configured to output the received function-related information list,
wherein the display module is configured to separate and display a function-related information display item applicable to the electronic device and the other electronic device or separate and display application or firmware update information and installable application information on the other electronic device.

6. The electronic device according to claim 4, further comprising a display module configured to output the received function-related information list,
wherein the control module is configured to request function-related information corresponding to an item selected by an occurred event in the function-related information list outputted to the display module from the service supporting device.

7. The electronic device according to claim 4, wherein the control module is configured to extract items to be transmitted to another electronic device from the function-related information list, or
upon receipt of a specific function-related information request from the other electronic device, is configured to transmit the received function-related information request to the service supporting device and receive corresponding function-related information and deliver the received function-related information to the other electronic device, or
upon receipt of a package collaborated between the electronic device and the other electronic device, is configured to extract routines to be transmitted to the other electronic device and deliver the extracted routines to the other electronic device, or
is configured to extract function-related information to be transmitted to another electronic device from the received function-related information and deliver the extracted function-related information to the other electronic device automatically.

8. The electronic device according to claim 4, wherein the function-related information comprises at least one of an application and firmware applicable to the other electronic device and update information on an application or firmware installed on the other electronic device.

9. The electronic device according to claim 1, wherein the communication module is configured to receive at least one of the function-related information list or the selected function-related information from the service supporting device in correspondence to a request for function-related information to be installed or updated on the other electronic device; and
the control module is configured to extract information to be delivered to the other electronic device from the received function-related information list or function-related information and deliver the extracted information to the other electronic device through the short range communication module.

10. The electronic device according to claim 9, further comprising a display module configured to separate and display function-related information applicable to each of the electronic device or the other electronic device or configured to separate and display application or firmware update information and installable application information on the other electronic device, or
configured to display at least one of an item of an application un-installed on the other electronic device, an item of an integrated application linked with the electronic device, an un-installable item, or an item of an application installed on the other electronic device, in correspondence to items of applications installed on the electronic device.

11. The electronic device according to claim 9, further comprising a display module configured to output the received function-related information list,
wherein the control module is configured to request function-related information corresponding to an item selected by a received event in the function-related information list outputted to the display module from the service supporting device.

12. The electronic device according to claim 9, wherein the control module is configured to extract items to be transmitted to the other electronic device from the function-related information list by the other electronic device, or upon receipt of a specific function-related information request from the other electronic device, is configured to transmit the received function-related information request to the service supporting device, receive corresponding function-related information, and deliver the received function-related information to the other electronic device, or is configured to extract function-related information to be transmitted to the other electronic device from the received function-related information and deliver the extracted function-related information to the other electronic device automatically, or upon receipt of a package collaborated between the electronic device and the other electronic device, is configured to extract routines to be transmitted to the other electronic device and deliver the extracted routines to the other electronic device.

13. The electronic device according to claim 1, further comprising a display module configured to display at least one of an item of an application un-installed on the other electronic device, an item of an integrated application linked with the other electronic device, an un-installable item, or an item of an application installed on the other electronic device in correspondence to installed application items.

14. A data processing method comprising:
collecting, by a first electronic device, device-related information on a second electronic device connectable through a short range communication channel in correspondence to an event occurrence;
transmitting, by the first electronic device, the collected device-related information and identification on the first electronic device to a service supporting device;
receiving, by the first electronic device, function-related information in corresponding to the device-related information from the service supporting device; and
transmitting, by the first electronic device, directly at least part of the function-related information to the second electronic device in corresponding to the device-related information,
wherein the function-related information is installable application information or updatable application information for the second electronic device.

15. The method according to claim 14, further comprising at least one of:
receiving a function-related information list; or
receiving an integrated application or integrated application item including some routines installable on the second electronic device and designed to perform a function through the first electronic device and some routines to be applied to the first electronic device.

16. The method according to claim 14, further comprising delivering, by the first electronic device, at least one of the function-related information and the function-related information list to the second electronic device.

17. The method according to claim 16, further comprising:
outputting, by the second electronic device, the function-related information list;
transmitting, by the second electronic device, a selection event for selecting at least one item from the function-related information list to the first electronic device;
transmitting, by the first electronic device, the selection event to the service supporting device;
transmitting, by the service supporting device, function-related information corresponding to the selection event to the first electronic device;
transmitting, by the first electronic device, function-related information corresponding to the selection event to the second electronic device; and
processing, by the second electronic device, the function-related information.

18. The method according to claim 17, further comprising delivering, by the second electronic device, the function-related information processing result to the first electronic device or delivering, by the second electronic device, the function-related information processing result to the service supporting device through the first electronic device.

19. The method according to claim 14, wherein the transmitting by the first electronic device the collected device related information and information on the first electronic device to a service supporting device comprises at least one of:
transmitting device-related information on the at least one second electronic device establishing the short range communication channel to the service supporting device;
transmitting device-related information on a second electronic device receiving a function management request among the second electronic devices establishing the short range communication channel to the service supporting device;
collecting pre-stored device-related information on at least one second electronic device and transmitting the collected device-related information to the service supporting device; and
transmitting device-related information selected by a user input in pre-stored device-related information on a second electronic device to the service supporting device.

20. The method according to claim 14, further comprising at least one of:
separating and displaying, by the first electronic device, function-related information applicable to each of the first electronic device and the second electronic device; and
separating and displaying, by at least one of the first electronic device and the second electronic device, application or firmware update information and installable application information on the second electronic device.

* * * * *